US010215251B2

(12) United States Patent
McCoy et al.

(10) Patent No.: US 10,215,251 B2
(45) Date of Patent: *Feb. 26, 2019

(54) INTERFERENCE ARRANGEMENT FOR SPRING

(71) Applicant: Barnes Group Inc., Bristol, CT (US)

(72) Inventors: Joel McCoy, Maumee, OH (US); Tyler Schroeder, Maumee, OH (US); Adrian Vine, Ann Arbor, MI (US)

(73) Assignee: Barnes Group Inc., Bristol, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/793,064

(22) Filed: Oct. 25, 2017

(65) Prior Publication Data

US 2018/0045265 A1    Feb. 15, 2018

Related U.S. Application Data

(63) Continuation of application No. 15/154,117, filed on May 13, 2016, now Pat. No. 9,822,838.

(60) Provisional application No. 62/161,556, filed on May 14, 2015.

(51) Int. Cl.
*F16F 13/00* (2006.01)
*F16F 7/09* (2006.01)

(52) U.S. Cl.
CPC .............. *F16F 13/005* (2013.01); *F16F 7/09* (2013.01); *F16F 2224/02* (2013.01)

(58) Field of Classification Search
CPC .. F16F 13/005; F16F 7/08; F16F 7/082; F16F 7/087; F16F 7/09; F16F 7/095; F16F 2224/02

See application file for complete search history.

(56) References Cited

U.S. PATENT DOCUMENTS

| | | | | |
|---|---|---|---|---|
| 3,788,626 A | * | 1/1974 | Isaacson | B60R 19/26 138/30 |
| 3,866,724 A | * | 2/1975 | Hollnagel | B60G 13/04 188/129 |
| 5,257,680 A | * | 11/1993 | Corcoran | F16F 7/02 188/129 |
| 6,702,266 B1 | * | 3/2004 | Dec | F16F 7/08 267/202 |
| 2002/0185348 A1 | * | 12/2002 | Flower | F16F 7/085 188/322.19 |
| 2003/0015830 A1 | * | 1/2003 | Miller | B60G 15/08 267/140.11 |

FOREIGN PATENT DOCUMENTS

GB        1411611        * 10/1975

* cited by examiner

*Primary Examiner* — Vishal R Sahni
(74) *Attorney, Agent, or Firm* — Fay Sharpe LLP

(57) ABSTRACT

A spring system that includes a compressible material that is used to control the speed of the rod movement.

24 Claims, 7 Drawing Sheets

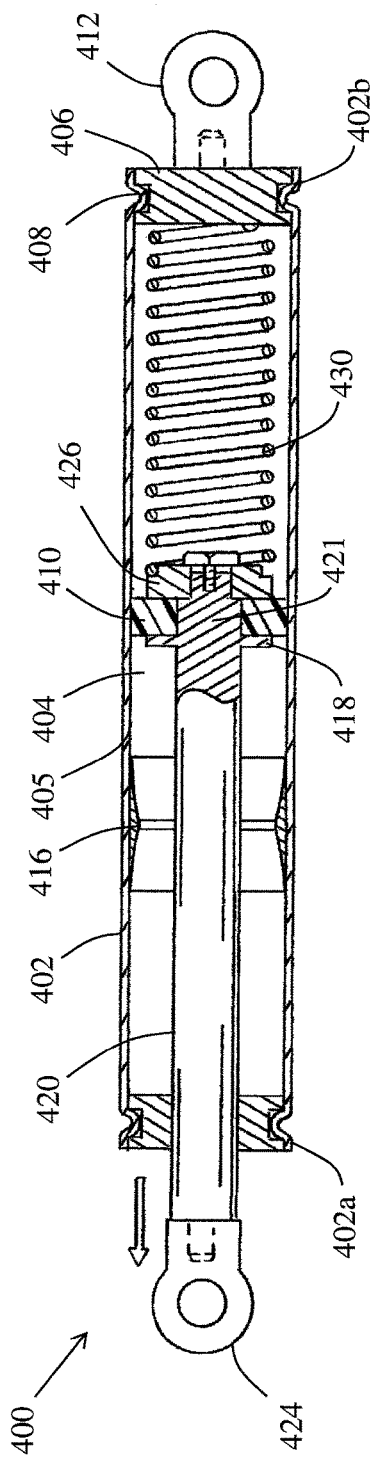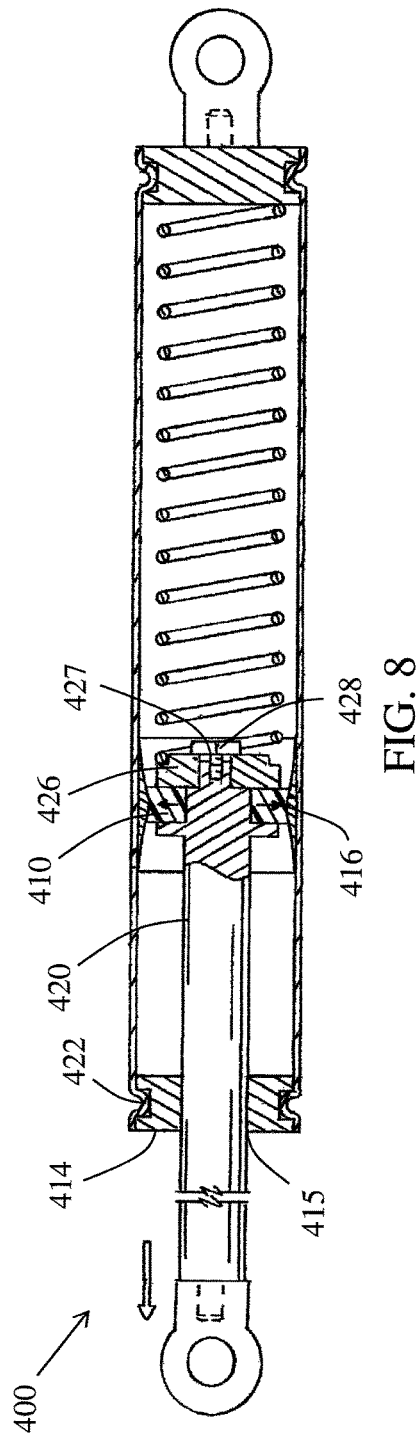
FIG. 7
FIG. 8

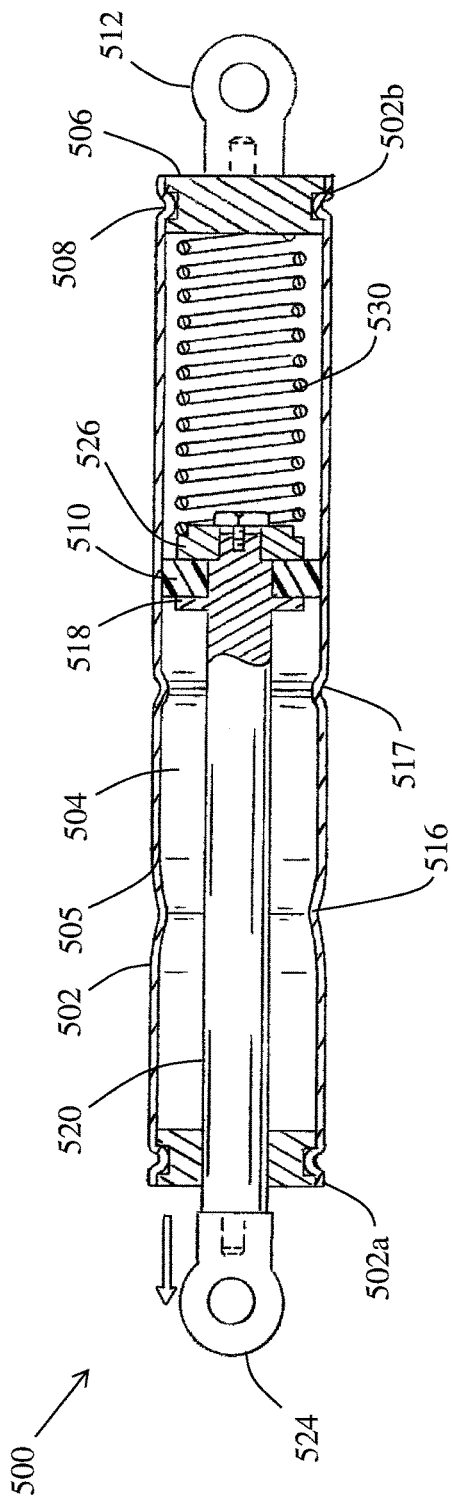
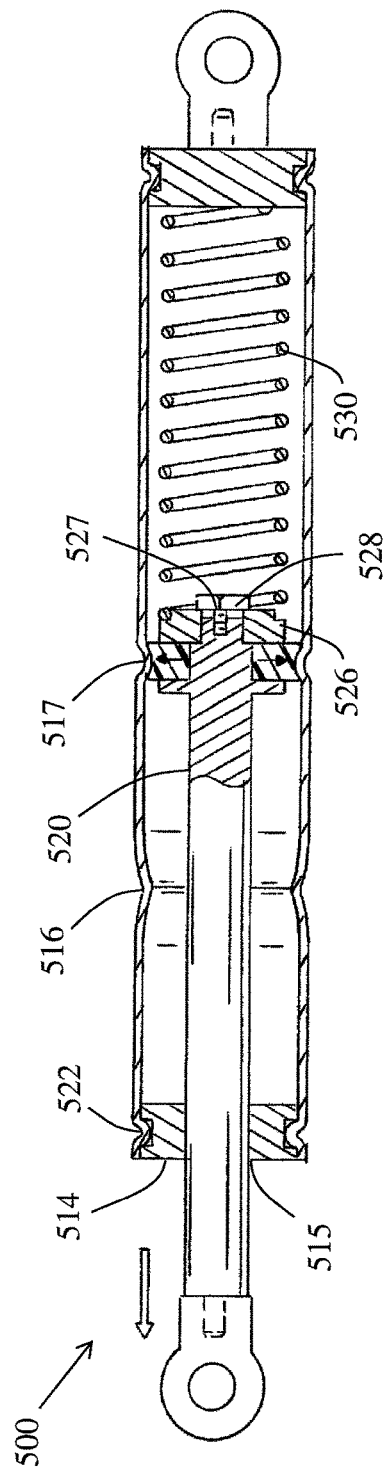

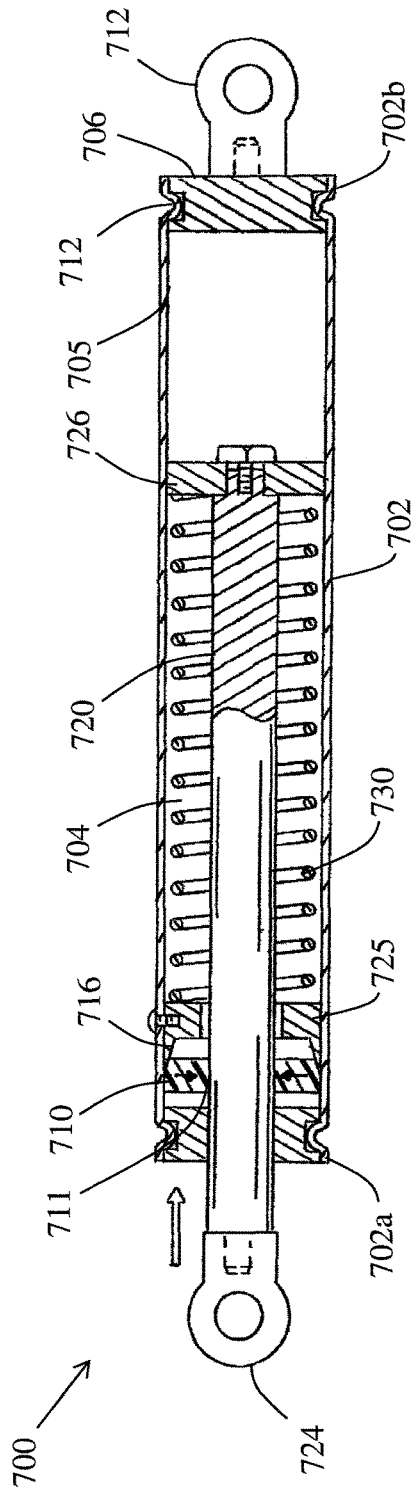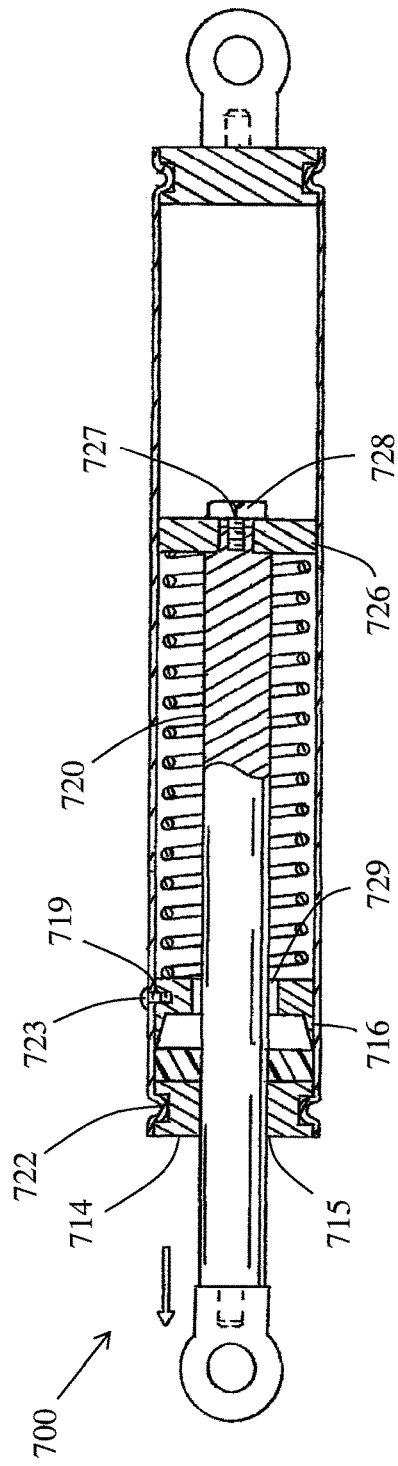
FIG. 13
FIG. 14

INTERFERENCE ARRANGEMENT FOR SPRING

The present invention is a continuation of U.S. patent application Ser. No. 15/154,117 filed May 13, 2016, which in turn claims priority on U.S. Provisional Patent Application Ser. No. 62/161,556, filed May 14, 2015, which is incorporated herein by reference.

The present invention relates to spring systems, particularly to a spring system that includes a compressible material, and more particularly to a spring system that includes a compressible material that creates friction when the rod moves within the housing body of the spring system. The spring system of the present invention can be used to control the speed of the rod movement. The spring system of the present invention can be used in the medical field, automotive industry, manufacturing industry, building industry, etc.

BACKGROUND ON THE INVENTION

A common spring system comprises a rigid spring housing to which a spring connects. The spring system allows for the positioning of two or more features or structures relative to one another in either a fixed or an adjustable location. For many types of springs, there is a need to control the movement of the rod as the rod moves between an extended and retracted position. Many of the prior art control mechanisms involve complicated and expensive arrangements.

In view of the prior art, there remains a need for a novel spring system that includes one or more components that can be used to further control the movement and the speed of movement of the rod in the spring system.

SUMMARY OF THE INVENTION

The present invention is directed to a novel spring assembly that includes the use of a compressible material to control the speed of the rod when the rod is moved axially in the housing body of the spring system. The novel spring can be a gas spring, a mechanical spring that includes one or more springs, a hydraulic spring that includes liquid, or a combination of gas, liquid and/or one or more mechanical springs.

In accordance with various non-limiting embodiments of the present invention, the spring system includes a housing body having an internal cavity. The internal cavity of the housing body can have a uniform cross-sectional shape and constant cross-sectional area along the longitudinal length of the housing body; however, this is not required. One or both ends of the housing body can include a bushing. One end of the housing body can include a plug or a permanent end seal. The plug (when used) can be configured to be removable or irremovable from the housing body. One or more indents in the housing body can optionally be used to facilitate in securing the plug to the housing body; however, this is not required. The housing body can optionally include one or more flanges to facilitate in securing the plug (when used) to the housing body; however, this is not required. As can be appreciated, other or alternative arrangements can be used to secure the plug to the housing body (e.g., adhesive, rivet, screw, pin, solder, weld bead, melted bond, etc.). As can also be appreciated, the front and/or rear end of the housing body can be a formed or sealed end that does not require a plug. The plug (when used) can be formed of a number of different materials (e.g., plastic or polymer material, rubber, metal, composite material, ceramic, wood, etc.). The rear end of the housing body can optionally include a connection arrangement that can be used to facilitate in connecting the rear end of the housing body to a fixture or other structure. Alternatively, the rear surface of the plug optionally includes a connection arrangement that can be used to facilitate in connecting the rear end of the spring system to a fixture or other structure. The configuration of the connection arrangement (when used) is non-limiting (e.g., threaded end, connection hole, grooves, ribs, slots, notches, hook, etc.). Optionally, the plug can be designed to form a fluid seal at the rear portion of the housing body; however, this is not required. As can be appreciated, the rear end of the housing body can include a sealed end that is irremovably connected to the housing body.

In another and/or alternative non-limiting aspect of the present invention, one or both ends of the housing body can include a bushing. A bushing positioned at the front end of the housing body can include an opening through the longitudinal length of the bushing for the purpose of enabling a rod to move through the bushing along the longitudinal axis of the housing body; however, this is not required. In one non-limiting configuration, the rod is configured to only extend outwardly from the front end of the housing body. As such, the spring system only includes a bushing at the front end of the housing body; however, this is not required. In another and/or alternative non-limiting configuration, the rod is configured to extend outwardly from both the front and rear ends of the housing body. In such an arrangement, a bushing is generally positioned at both the front and rear ends of the housing body; however, this is not required. The bushing can be configured to be removable or irremovable from the housing body. One or more indents and/or flanges in the internal cavity of the housing body can optionally be used to facilitate in securing the bushing to the housing body. As can be appreciated, other or alternative arrangements can be used to secure the bushing to the housing body (e.g., adhesive, rivet, screw, nail, pin, solder, weld bead, melted bond, ribs, grooves, indents, notches, etc.). The bushing (when used) can be formed of a number of different materials (e.g., plastic or polymer material, rubber material, composite material, ceramic, wood, etc.). The bushing can be configured to form or facilitate in forming a fluid seal at the front and/or rear ends of the housing body; however, this is not required. Generally, the bushing is configured to partially or fully encircle a portion of the rod. The thickness and shape of the bushing (when used) is non-limiting.

In still another and/or alternative non-limiting aspect of the present invention, a rod has a front and rear end and is positionable along the longitudinal axis of the housing body, and generally along the central longitudinal axis of the housing body; however, this is not required. At least a portion of the rod is configured to be axially movable in the internal cavity of the housing body. In another and/or alternative non-limiting aspect of the present invention, at least a portion of the rod always extends outwardly from the front end of the housing body through an opening and is configured to move along a longitudinal axis of the housing body; however, this is not required. As can be appreciated, the front end of the rod can extend outwardly from one end of the housing body and the back end of the rod can extend outwardly from the opposite end of the housing body; however, this is not required. The shape and configuration of the rod are non-limiting. In one non-limiting configuration, the housing body has a generally tubular shape, and the cross-sectional shape of the rod and housing body is generally circular; however, it can be appreciated that the rod, housing body and/or internal cavity of the housing body can have a cross-sectional shape other than circular (e.g., square, oval, triangular, rectangular, polygonal, etc.). The cross-sectional area of the rod is generally constant along the length of the portion of the rod that moves through the front bushing; however, this is not required. In one non-limiting embodiment, the cross-sectional area of a portion of the rod that moves within the internal cavity of the housing body is generally less than the cross-sectional area of the internal cavity of the housing body. The end of the rod that extends outwardly from the end of the housing body can optionally include a connection arrangement (e.g., threaded end, connection hole, grooves, slots, hook, ribs, notches, etc.) that can be used to secure or connect the end of the rod to a fixture or structure. If one end of the housing body does not have an end of the rod extending outwardly therefrom, such end of the housing body can optionally include a connection arrangement (e.g., threaded end, connection hole, grooves, slots, hook, ribs, notches, etc.) that can be used to secure or connect such end of the housing body to a fixture or structure. The size, length, shape, and material of the housing body are non-limiting. Likewise, the size, shape, length, and material of the rod are non-limiting.

In still yet another and/or alternative non-limiting aspect of the present invention, a bushing is generally located at an end of the housing body where the rod extends outwardly from the end of the housing body. A piston or guide bushing (when used) is located in the internal cavity of the housing body and connected to the rod. Generally, the piston or guide bushing is connected to one end of the rod; however, the piston can be connected to other regions of the rod that are located in the internal cavity of the housing body. The piston or guide bushing can be connected to the rod by any number of arrangements (e.g., adhesive, rivet, screw, nail, pin, solder, weld bead, melted bond, ribs, grooves, indents, notches, etc.). The piston or guide bushing can include a hole wherein the body of a screw can be inserted therethrough and threaded to the end of the rod, thereby securing the piston or guide bushing to the end of the rod or other portion of the rod; however, this is not required.

In another and/or alternative non-limiting aspect of the present invention, one or more springs (e.g., mechanical springs, etc.) are positionable in the internal cavity of the housing body. When one or more mechanical springs are used, the one or more mechanical springs can be located on one or both sides of the piston or guide busing. When two or more mechanical springs are located in the internal cavity of the housing body, the spring free length, wire type, wire thickness, cross-sectional shape of the wire, number of windings, wire material, and/or spring force of each of the springs can be the same or different. The free length of one or more of the springs can be greater than, equal to, or less than the longitudinal length of the internal cavity. As can be appreciated, when two or more springs are located on the same side of the piston or guide bushing, two or more of the springs can be in a nested relationship and have the same or different winding direction when in the nested relationship; however, this is not required. As can be appreciated, a fluid (e.g., gas and/or liquid) can be located on one or both sides of the piston or guide bushing; however, this is not required. The fluid can be used in combination with one or more springs or be substituted for one or more springs. When a fluid is included in the internal cavity of the housing body, the piston or guide bushing can be configured to controllably allow the fluid to flow through or past the piston or guide busing as the piston or guide bushing moves along the longitudinal length of the housing body; however, this is not required.

In yet another and/or alternative non-limiting aspect of the present invention, one or more compressible sleeves are positionable in the internal cavity of the housing body. The number of compressible sleeves positioned in the internal cavity of the housing body is non-limiting. The size, shape, and thickness of the compressible sleeves are non-limiting. The one or more compressible sleeves are configured to compress and/or deform when a force is applied to the one or more compressible sleeves. The one or more compressible sleeves are used to at least partially control the movement of the rod in the internal cavity of the housing body. In one non-limiting configuration, the one or more compressible sleeves are configured to compress and/or deform due to the movement of the rod in the internal cavity of the housing body. When the one or more compressible sleeves are compressed and/or deformed, such deformation of the one or more compressible sleeves is configured to interact with the rod and/or inner surface of the internal cavity of the housing body, and thereby affect the movement and/or speed of the movement of the rod as the rod moves along the longitudinal axis of the housing body. As such, the force required to cause the rod to move along the longitudinal axis of the housing body can be at least partially controlled by the use of one or more compressible sleeves in the internal cavity of the housing body. When a plurality of compressible sleeves are used in the internal cavity of the housing body, the thickness, shape, and/or material of the compressible sleeves can be the same or different. When one or more bushings are used, the material of the bushing is generally different from the material of the one or more compressible sleeves; however, this is not required. The material of the piston or guide bushing (when used) is generally different from the material of the one or more compressible sleeves; however, this is not required. The material of the rod, springs, and housing body is different from the material of the one or more compressible sleeves. The material used to form the one or more compressible sleeves is non-limiting. Non-limiting examples of materials include rubber, nylon, silicon, polyester, urethane, polyether-based urethane, various polymer materials, sponge material, cork material, etc.). In one specific non-limiting material, the one or more compressible sleeves are formed of a compressible urethane material.

In another and/or alternative non-limiting aspect of the present invention, the material of the bushing (when used) is different from the material of the one or more compressible sleeves. The thickness of the bushing (when used) is generally greater than the thickness of the compressible sleeve that is positioned closest to the bushing; however, this is not required. Generally, the bushing (when used) is less compressible than at least one, and typically all, of the compressible sleeves used in the spring system; however, this is not required. In one non-limiting configuration, at least one of the compressible sleeves is at least 10% more compressible than the bushing (when used), typically at least 15% more compressible than the bushing (when used), more typically at least 20% more compressible than the bushing (when used), still more typically at least 25% more compressible than the bushing (when used), and yet still more typically at least 30% more compressible than the bushing (when used). In another non-limiting configuration, all of the compressible sleeves are more compressible than the bushing (when used). In another and/or alternative non-limiting configuration, the durometer of the compressible material that partially or fully forms the compressible sleeve is at least about 20 Shore A and less than about 120 Shore B using the ASTM D2240 testing standard. In one non-limiting configuration, the durometer of the compressible material is at least about 30 Shore A and less than about 100 Shore B using the ASTM D2240 testing standard, and typically at least 35 Shore A and less than 80 Shore B using the ASTM D 2240 testing standard. The outer surface of the compressible sleeve can optionally include a coating and/or be layered with a material that creates increased or reduced friction with the inner surface of the internal cavity and/or with one or more structures in the internal cavity. The opening of the compressible sleeve that is configured to receive at least a portion of the rod can optionally include a coating and/or be layered with a material that creates increased or reduced friction with the rod.

In still another and/or alternative non-limiting aspect of the present invention, the rod includes one or more stops that are used to limit the movement of the one or more compressible sleeves along the longitudinal length of the rod; however, this is not required. In one non-limiting configuration, the rod includes at least two stops; however, this is not required. The configuration of the one or more stops is non-limiting. In one non-limiting configuration, one of the stops on the rod can be formed by the guide piston or guide bushing that is secured to the rod; however, this is not required. In another non-limiting configuration, one of the stops on the rod can be formed by the guide piston or guide bushing that is secured to the rod and another stop can be secured to or formed on the rod at a location that is spaced at some distance (which spacing is generally greater than the thickness of the thickness or combined thicknesses of the one or more compressible sleeve located between the two stops; however, such spacing can be equal to or less than the thickness of the thickness or combined thicknesses of the one or more compressible sleeve located between the two stops) from the guide piston or guide bushing; however, this is not required. In another non-limiting configuration, one of the stops on the rod can be formed by the guide piston or guide bushing that is secured to the rod and another stop can be secured to or formed on the rod at a location that is spaced at some distance (which spacing is generally greater than the thickness of the thickness or combined thicknesses of the one or more compressible sleeve located between the two stops; however, such spacing can be equal to or less than the thickness of the thickness or combined thicknesses of the one or more compressible sleeve located between the two stops) from the guide piston or guide bushing; however, this is not required. In another non-limiting configuration, two or more of the stops are connected to or formed on the rod and are spaced from the guide piston or guide bushing that is secured to the rod. The adjacently positioned stops are spaced at some distance from one another (which spacing is generally greater than the thickness of the thickness or combined thicknesses of the one or more compressible sleeve located between the two stops; however, such spacing can be equal to or less than the thickness of the thickness or combined thicknesses of the one or more compressible sleeve located between the two stops); however, this is not required.

In yet another and/or alternative non-limiting aspect of the present invention, the cross-sectional shape and/or cross-sectional area of the rod that is located between the stops is non-constant so as to cause the one or more compressible sleeves to increase or decrease in compression as the one or more compressible sleeves moves over the differing cross-sectional shapes and/or cross-sectional areas of the rod as the rod moves in the internal cavity of the housing body. The number of regions along the longitudinal length of the rod that have cross-sectional shapes and/or cross-sectional areas that are located between the stops is non-limiting. The cross-sectional shapes (e.g., oval, triangular, square, polygonal, circular, etc.) and/or sizes of the different cross-sectional areas are non-limiting. The rod can include one or more sets of stops having one or more compressible sleeves associated with each set of stops; however, this is not required.

In still yet another and/or alternative non-limiting aspect of the present invention, the inner surface of the internal cavity of the housing body can have varying cross-sectional shapes in the internal cavity along the longitudinal length of the internal cavity and/or cross-sectional areas and/or includes structures on the inner surface of the internal cavity of the housing body to create varying cross-sectional shapes and/or cross-sectional areas in the internal cavity along the longitudinal length of the internal cavity to cause compression and/or decompression of the one or more compressible sleeves as the rod moves within the internal cavity of the housing body. The one or more varying cross-sectional shapes in the internal cavity resulting from the housing body and/or structures on the inner surface of the internal cavity of the housing body can be configured to function as stops that inhibit or prevent one or more compressible sleeves from moving past such regions in the internal cavity, and/or the one or more varying cross-sectional shapes in the internal cavity resulting from the housing body and/or structures on the inner surface of the internal cavity of the housing body can be configured to cause the one or more compressible sleeves to be compressed or decompressed as the one or more compressible sleeves move past such one or more varying cross-sectional shapes in the internal cavity.

In another and/or alternative non-limiting aspect of the present invention, one stop using the spring system is the guide piston or guide bushing on the rod and another stop is spaced from the guide piston or guide bushing in the form of a flange extending outwardly from the rod. The flange can be configured to extend to the inner wall surface of the internal cavity of the housing body; however, this is not required. If the flange extends to the inner wall surface of the internal cavity, the flange can be used as a secondary guide for the rod as the rod moves within the housing body; however, this is not required. The one or more compressible sleeves that are positioned between the flange and the guide piston or guide bushing are configured to exert a frictional force between the one or more compressible sleeves and the rod and the inner surface of the interior cavity. The one or more compressible sleeves can be configured such that as the rod moves through the one or more compressible sleeves, the one or more compressible sleeves are caused to be compressed, which compression results in additional friction being created between the one or more compressible sleeves and the rod and/or between the one or more compressible sleeves and the inner surface of the internal chamber. The change in compression of the one or more compressible sleeves can be the result of the change in cross-sectional shape and/or cross-sectional size of the rod that is passing through the one or more compressible sleeves. The increased friction created between the one or more compressible sleeves and the rod and/or between the one or more compressible sleeves and the inner surface of the internal chamber results in a change in the amount of friction realized by the rod. The amount of friction exerted by the one or more compressible sleeves on the rod and/or on the inner surface of the internal chamber can be at least partially controlled by 1) the amount of spacing (if any) between the one or more compressible sleeves and the inner surface of the internal cavity of the housing body, 2) the amount of spacing (if any) between the one or more compressible sleeves and the rod, 3) the durometer of the one or more compressible sleeves, 4) the thickness of the one or more compressible sleeves, and/or 5) the amount of compression caused on the one or more compressible sleeves as the rod moves through the one or more compressible sleeves. In one non-limiting configuration, one or more of the compressible sleeves fully encircle the rod and the opening in one or more of the compressible sleeves is sized and shaped to allow the rod to pass therethrough. The cross-sectional shape of the opening in the one or more compressible sleeves can be the same or similar to the cross-sectional shape of the rod that passes through the opening and the cross-sectional area of the opening in the one or more compressible sleeves can be the same or greater than the cross-sectional area of the rod that passes through the opening.

In another and/or alternative non-limiting aspect of the present invention, there is provided one or more compressible sleeves between two stops. The one or more compressible sleeves partially or fully encircle the rod. One or more of the compressible sleeves are configures to move along at least a portion of the rod that is positioned between the two stops. The cross-sectional shape and/or cross-sectional size of the rod are variable for at least a portion of the rod that is positioned between the two stops and the one or more compressible sleeves are caused to engage, move at least partially past, or move fully past such portions of the rod as the rod moves between within the interior cavity.

In another and/or alternative non-limiting aspect of the present invention, there is provided one or more compressible sleeves between two stops. The one or more compressible sleeves partially or fully encircle the rod. One or more of the compressible sleeves are configured to move along at least a portion of the rod that is positioned between the two stops. The cross-sectional shape and/or cross-sectional size of the interior cavity are variable for at least a portion of the interior cavity and the one or more compressible sleeves are caused to engage, move at least partially past, or move fully past such portions of the interior cavity as the rod moves within the interior cavity.

In another and/or alternative non-limiting aspect of the present invention, there is provided one or more compressible sleeves between two stops. The one or more compressible sleeves partially or fully encircle the rod. One or more of the compressible sleeves are configured to move along at least a portion of the rod that is positioned between the two stops. The cross-sectional shape and/or cross-sectional size of the interior cavity are variable for at least a portion of the interior cavity and the one or more compressible sleeves are caused to engage, move at least partially past, or move fully past such portions of the interior cavity as the rod moves between within the interior cavity. Also, the cross-sectional shape and/or cross-sectional size of the interior cavity are variable for at least a portion of the interior cavity and the one or more compressible sleeves are caused to engage, move at least partially past, or move fully past such portions of the interior cavity as the rod moves within the interior cavity.

In another and/or alternative non-limiting aspect of the present invention, there is provided one or more compressible sleeves between two stops. The one or more compressible sleeves partially or fully encircle the rod. One or more of the compressible sleeves are configured to remain in substantially a fixed position between the two stops. The cross-sectional shape and/or cross-sectional size of the interior cavity are variable for at least a portion of the interior cavity and the one or more compressible sleeves are caused to engage, move at least partially past, or move fully past such portions of the interior cavity as the rod moves within the interior cavity.

In still yet another and/or alternative non-limiting aspect of the present invention, the amount of friction force applied by the one or more compressible sleeves to the rod and/or inner surface of the internal cavity of the housing body can be controlled by controlling the 1) size, thickness, shape, and/or material of the one or more compressible sleeves, 2) the spacing of the one or more compressible sleeves from the inner surface of the internal cavity of the housing body, 3) the spacing of the one or more compressible sleeves from the rod, 4) the cross-sectional shape and/or cross-sectional size of the rod portion over which the one or more compressible sleeves moves, 5) the spacing of the stops from one another, 6) the shape of the stops (e.g., flat face, curved face, etc.), 7) the number of stop sets and compressible sleeves used in each stop set, 8) the cross-sectional shape and/or cross-sectional size of the interior cavity of the housing body, 9) the degree to which the one or more compressible sleeve compresses and deforms in a compressed state, 10) the durometer of the one or more compressible sleeves, and/or 11) the amount of force applied to the compressible sleeve during the axial movement of the rod in the housing body.

In one non-limiting aspect of the present invention, there is provided a method for affecting the compression of the spring system between extended and retracted positions, wherein the method comprising the steps of:

a. providing a spring system and, b. applying a force to the rod to cause the rod to move within the interior cavity of housing body. The movement of the rod causes 1) a first compressible and deformable material to move along a portion of the rod defined between first and second stops to cause the first compressible and deformable material to increase or decrease in deformation depending on a location of the first compressible and deformable material is along the portion of the rod and/or the location of the first compressible and deformable material in the interior cavity, and/or 2) the first compressible and deformable material to move along an inner surface of the interior cavity to cause the first compressible and deformable material to increase or decrease in deformation depending on a location of the first compressible and deformable material in the interior cavity.

It is accordingly one non-limiting object of the present invention to provide an improved spring assembly.

Another and/or alternative non-limiting object of the present invention is the provision of a spring assembly that includes a compressible material.

Still another and/or alternative non-limiting object of the present invention is the provision of a spring assembly that includes a compressible material that is used to at least partially control the speed of the rod movement.

Yet another and/or alternative non-limiting object of the present invention is the provision of a spring assembly that includes a compressible material that is positioned in the internal cavity of the housing body and is configured to compress and deform as the rod moves within the housing body of the spring system.

Still yet another and/or alternative non-limiting object of the present invention is the provision of a spring assembly that includes a compressible material that is configured to be compressed and deformed such that the deformation of compressible material is configured to interact with the rod and/or inner surface of the internal cavity of the housing body and thereby affect the movement and/or speed of movement as the rod moves along the longitudinal axis of the housing body.

Another and/or alternative non-limiting aspect of the present invention is the provision of a spring assembly that includes two or more compressible sleeves wherein the thickness, shape, and/or material of the compressible sleeves can be the same or different.

Still another and/or alternative non-limiting object of the present invention is the provision of a spring assembly that includes a compressible material that is formed of rubber, nylon, silicon, polyester, urethane, polyester-based urethane, various polymer materials, sponge material, cork material, etc.

Yet another and/or alternative non-limiting object of the present invention is the provision of a spring assembly that includes a rod having at least two locations that are configured to limit the movement of the compressible material along the length of the rod as the rod moves within the housing body of the spring system.

Still yet another and/or alternative non-limiting object of the present invention is the provision of a spring assembly that includes a compressible material having a durometer of at least 20 Shore A and less than 130 Shore D using the ASTM D224-testing standard.

Another and/or alternative non-limiting object of the present invention is the provision of a spring assembly that can be used in a wide variety of applications.

Still another and/or alternative non-limiting object of the present invention is the provision of a spring assembly that achieves direction-dependent friction dampening in a "strut" form factor rod and tube configuration.

Yet another and/or alternative non-limiting object of the present invention is the provision of a spring assembly that requires no seals or fluids.

Still yet another and/or alternative non-limiting object of the present invention is the provision of a spring assembly in which the inner contact surface and/or outer contact surface (as it relates to the compressible material) can be contoured.

Another and/or alternative non-limiting object of the present invention is the provision of a spring assembly that varies the contour changes of the dampening performance.

These and other objects and advantages will become apparent from the discussion of the distinction between the invention and the prior art and when considering the preferred embodiment shown in the accompanying drawings.

BRIEF DESCRIPTION OF THE DRAWINGS

Reference may now be made to the drawings, which illustrate various embodiments that the invention may take in physical form and in certain parts and arrangements of parts wherein:

FIG. 7 illustrates a side cross-sectional view of another non-limiting spring system in accordance with the present invention wherein the spring rod is moving toward the fully extended position;

FIG. 8 is a side cross-sectional view of FIG. 7 wherein the spring rod continues to move toward the fully extended position;

FIG. 9 illustrates a side cross-sectional view of another non-limiting spring system in accordance with the present invention wherein the spring rod is moving toward the fully extended position;

FIG. 10 is a side cross-sectional view of FIG. 9 wherein the spring rod continues to move toward the fully extended position;

FIG. 13 illustrates a side cross-sectional view of another non-limiting spring system in accordance with the present invention wherein the spring rod is moving toward the fully retracted position; and, FIG. 14 is a side cross-sectional view of FIG. 13 wherein the spring rod is moving toward the fully extended position.

DETAILED DESCRIPTION OF A NON-LIMITING EMBODIMENTS

Figure 1:
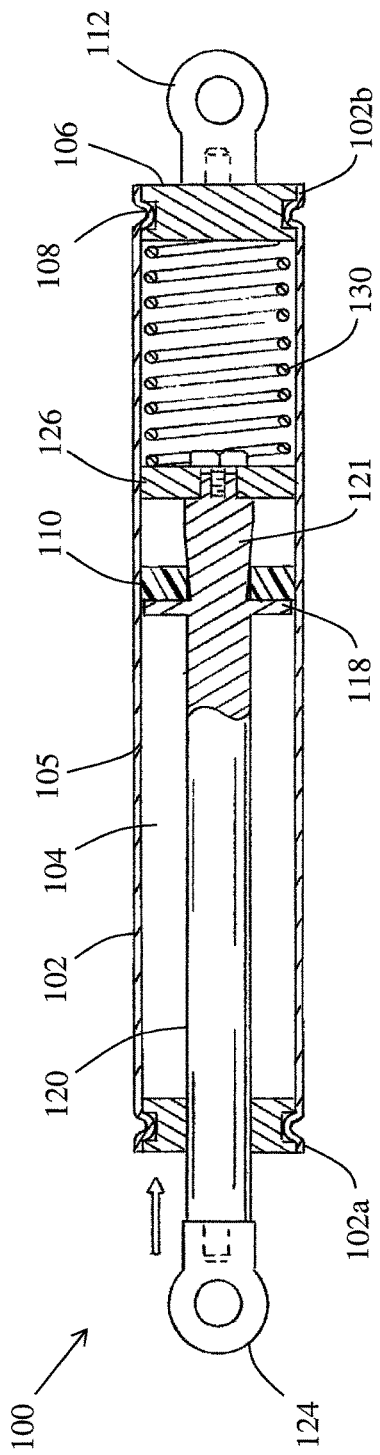
FIG. 1 illustrates a side cross-sectional view of a non-limiting spring system in accordance with the present invention wherein the spring rod is moving toward the fully retracted position.

Referring now to the drawings, wherein the showings are for the purpose of illustrating non-limiting embodiments of the invention only and not for the purpose of limiting the invention, FIGS. 1-14 illustrate various non-limiting spring systems in accordance with the present invention.

Figure 2:
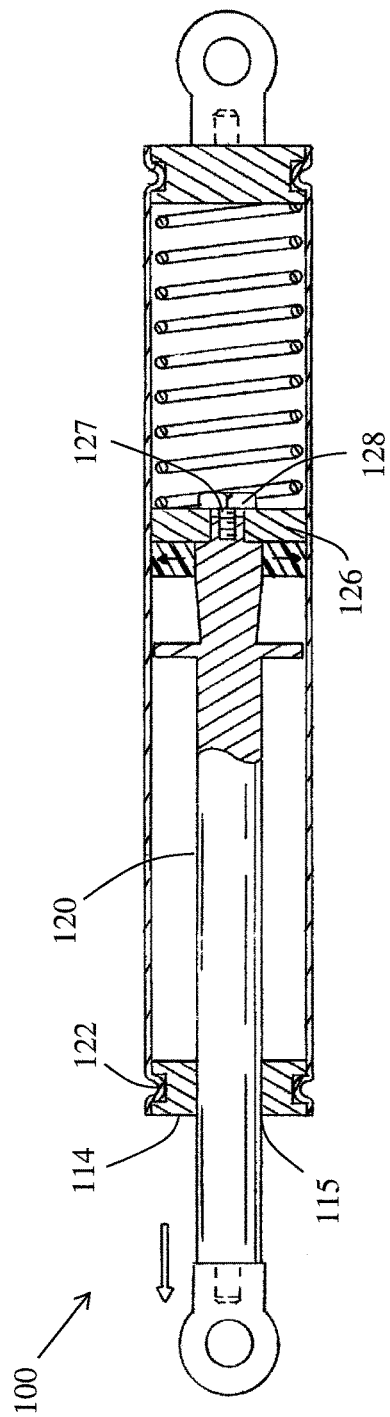
FIG. 2 is a side cross-sectional view of FIG. 1 wherein the spring rod is moving toward the fully retracted position.

Referring now to FIGS. 1-2, there is illustrated a spring system 100 including a compressible sleeve 110. The spring system 100 is illustrated as being in the form of a strut and including a housing body 102 having an internal cavity 104 and a rod 120. The internal cavity has an inner surface 105. The rod is configured to move along the longitudinal axis of the housing body between a fully retracted and fully extended position.

The internal cavity 104 of housing body 102 has a generally uniform cross-sectional shape and a generally constant cross-sectional area along the portion of the longitudinal length of the housing body wherein piston or guide bushing 126 moves within the internal cavity; however, this is not required. Generally, the cross-sectional shape is circular. The rear end 102b of housing body 102 is illustrated as including a plug 106. The plug can be designed to be removable from the housing body; however, this is not required. Indents 108 in the wall of the housing body 102 are used to facilitate in securing the plug 106 to the housing body. The rear end 102b of the housing body is illustrated as also including a connection arrangement 112 including a circular opening that can be used to facilitate in connecting the rear end of the spring system to a fixture or other structure. The connection arrangement 112 can be connected to the rear outside surface of the plug; however, this is not required. As can be appreciated, the rear end 102b of the housing body can alternatively include a plate that is removably or irremovably connected to (e.g., rivet, adhesive, weld bead, melted seam, screw, etc.) or formed on the housing body.

The front end 102a of the housing body 102 includes a bushing 114. Bushing 114 includes an opening 115 to enable at least a portion of a rod 120 to move through the bushing along the longitudinal axis of the housing body. Rod 120 is configured to extend at least partially outwardly from the front end 102a of the housing body. Front flanges 122 in the housing body 102 are used to facilitate in securing the bushing 114 to the housing body. As can be appreciated, other or additional means (e.g., rivet, adhesive, weld bead, melted seam, screw, etc.) can be used to connect the bushing 114 to the front end 102a of the housing body.

In operation, as seen in FIGS. 1-2, rod 120 extends outwardly through opening 115 in the front end 102a of the housing body 102 and is configured to move along a longitudinal axis of the housing body. The front end of rod 120 is illustrated as including a connection arrangement 124. The connection arrangement can include a connection structure (e.g., a circular opening, threaded opening, threaded extension, etc.) for the purpose of facilitating connection of the front end of the rod to a fixture or other structure.

Rod 120 includes a piston or guide bushing 126 connected to the rear portion of the rod; however, it can be appreciated that the piston or guide bushing can be positioned on the rod in other locations. It can also be appreciated that the rod can include more than one piston or guide bushing. The piston or guide bushing 126 includes a hole 127 wherein the body of a screw 128 is inserted therethrough so as to secure the piston or guide bushing to the end of the rod; however, other connection arrangements can be used (e.g., adhesive, rivet, bolt, weld bead, snap lock, etc.). In such a configuration, the piston or guide bushing 126 is configured to stabilize the position of the rod in the interior cavity as the rod moves between the fully extended and retracted positions; however, this is not required.

As illustrated in FIGS. 1-2, a spring arrangement in the form of a mechanical spring 130 is positioned in the internal cavity 104 of the housing body 102. The mechanical spring 130 is positioned between the piston and the rear end of the housing body. A first end of the mechanical spring 130 can be connected to the rear surface of the piston or guide bushing 126; however, this is not required. A second end of the mechanical spring can be connected to the front surface of the rear plug 106; however, this is not required. The mechanical spring can be positioned in the internal cavity and the ends of the spring are not connected to any structure. The mechanical spring is positioned in the internal cavity to bias the rod in a partial or fully extended position. As can be appreciated, two or more springs can be positioned between the piston and the rear end of the housing body. As also can be appreciated, two or more springs can be positioned between the piston and the front end of the housing body. As can be appreciated, one or both sides of the piston or guide bushing can include more than one mechanical spring. As can also be appreciated, one or both sides of the piston or guide bushing can be absent a mechanical spring. As can also be appreciated, the spring arrangement can include a fluid (e.g., liquid and/or gas) that can be used in combination with the mechanical spring or can be substituted for the mechanical spring.

Compressible sleeve 110 is positioned in the internal cavity 104 of the housing body 102 between a stop 118 and the piston or guide bushing 126. As can be appreciated, more than one compressible sleeve can be positioned in the internal cavity. The compressible sleeve 110 is configured to compress and deform when a force is applied to the compressible sleeve. When the compressible sleeve 110 is compressed and deformed, such deformation causes the compressible sleeve to exert or create additional friction between the compressible sleeve, the rod, and/or between the compressible sleeve and the inner surface of the internal cavity 104 of the housing body 102. As such, the compression and/or deformation of the one or more compressible sleeves affects the movement and/or speed of movement of the rod 120 as the rod moves along the longitudinal axis of the housing body 102. The force required to cause the rod to move along the longitudinal axis of the housing body can be at least partially controlled by the use of one or more compressible sleeves. The outer peripheral edge of the stop and the outer peripheral edge of the piston or guide bushing are positioned at or closely adjacent to the inner surface of the interior cavity. The stop can cooperate with the piston or guide bushing in functioning as maintaining the position of the rod in the interior cavity as the rod moves between the fully extended and retracted positions, and/or can form a partial or full fluid seal in the interior cavity. The outer peripheral edge of the compressible sleeve is also illustrated as being positioned at or closely adjacent to the inner surface of the interior cavity. As such, the compressible sleeve can also or alternatively be used with the stop and/or the piston or guide bushing in functioning as maintaining the position of the rod in the interior cavity as the rod moves between the fully extended and retracted positions, and/or can form a partial or full fluid seal in the interior cavity.

As seen in FIGS. 1 and 2, the variable section 121 of rod 120 increases in cross-sectional size from the stop 118 to the piston or guide bushing 126. The increase in cross-sectional area of the rod from the stop to the piston or guide bushing 126 is illustrated as being non-continuous in that the cross-sectional area near the piston or guide bushing 126 remains constant; however, this is not required. As can be appreciated, the variable section of the rod can be configured to continuously increase from the stop 118 to the piston or guide bushing 126

Referring now to FIG. 1, the rod is illustrated as being moved toward the fully retracted position. As the rod moves toward the fully retracted position, spring 130 is caused to compress and the compressible sleeve 110 is caused to move along the variable section 121 toward stop 118. The surface of variable section 121 can be formed of a material and/or coated with a material to facilitate in the movement of the compressible sleeve along the longitudinal length of the variable section; however, this is not required. When the compressible sleeve is located adjacent to stop 118, the cross-sectional area of variable section 121 is at its smallest value and thus causes no, or the smallest amount of, deformation of the compressible sleeve when the compressible sleeve is located adjacent to stop 118. The opening in the compressible sleeve can have the same or greater cross-sectional area as the cross-sectional area of the variable section that is located adjacent to the stop. Alternatively, the opening in the compressible sleeve can have a smaller cross-sectional area as the cross-sectional area of the variable section that is located adjacent to the stop. In one non-limiting configuration, all or a portion of the outer surface of the compressible sleeve, when the compressible sleeve is located adjacent to stop 118, can be spaced from the inner surface of the interior cavity and thus not be in a compressed state; however, this is not required. In another non-limiting configuration, the outer surface of the compressible sleeve, when the compressible sleeve is located adjacent to stop 118, can be in contact with the inner surface of the interior cavity and thus be in a compressed state or be in a state just prior to the compression of the compressible sleeve; however, this is not required. In another non-limiting configuration, the outer surface of the compressible sleeve, when the compressible sleeve is located adjacent to stop 118, can be in contact with the inner surface of the interior cavity and be in the least compressed state as compared to the compressed state of the compressible sleeve when located in other regions of the variable section; however, this is not required.

Referring now to FIG. 2, when the rod moves toward the fully extended position, spring 130 is caused to expand and the compressible sleeve is caused to move along the variable section 121 toward piston or guide bushing 126. As the compressible sleeve moves toward piston or guide bushing 126, the cross-sectional area of variable section 121 increases, thereby causing the compressible sleeve to compress and deform and exert a pressure on the inner surface of the interior cavity as illustrated by the arrows, which pressure increases the frictional force between the compressible sleeve and the inner surface of the interior cavity. Such increased friction results in added force being required to cause the rod to further move toward the fully extended position. The farther the compressible sleeve moves on the variable section toward the piston or guide bushing 126, the more the compressible sleeve is caused to compress and deform; thus, the more pressure the compressible sleeve exerts on the inner surface of the interior cavity. The amount of force needed to cause the rod to continue to move toward the fully extended position continues to increase until the compressible sleeve is positioned adjacent to the piston guide or bushing as illustrated in FIG. 2. As such, the length and shape of the variable portion in combination with the size, shape, thickness and material of the compressible sleeve can be selected to create customized force profiles required to move the rod between the fully extended and fully retracted positions. The use or one or more mechanical springs and/or fluid in the interior cavity can also be used to customize the force profiles of the spring system.

When the compressible sleeve is positioned adjacent to the piston or guide bushing 126, and the rod is moved toward the fully retracted position, the compressible sleeve is caused to move toward stop 118. As the compressible sleeve moves toward stop 118, the amount of friction force between the compressible sleeve and the inner surface of the interior cavity decreases; thus, the force required to continue to move the rod toward the fully retracted position also decreases. The amount of friction continues to decrease until the compressible sleeve is positioned adjacent to stop 118 as illustrated in FIG. 1.

Figure 3:
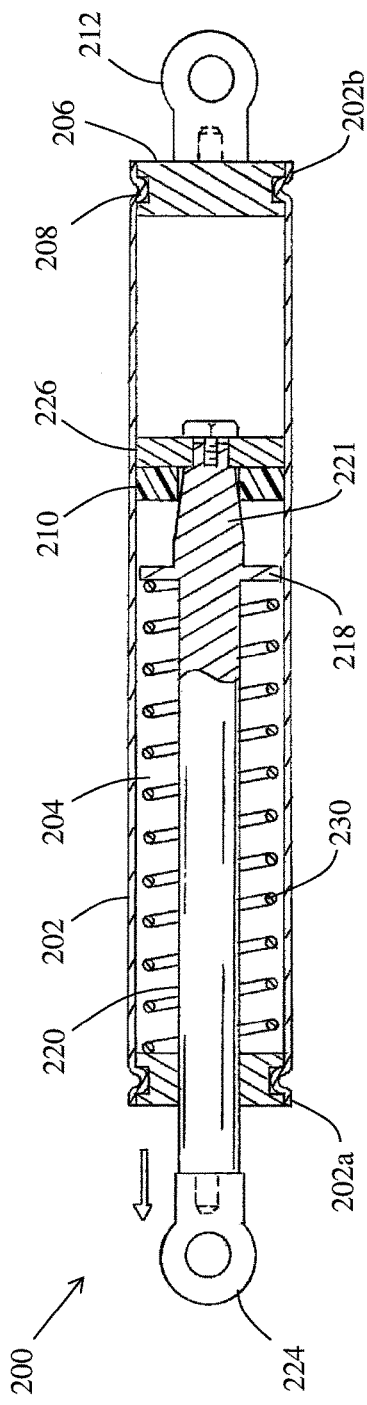
FIG. 3 illustrates a side cross-sectional view of another non-limiting spring system in accordance with the present invention wherein the spring rod is moving toward the fully extended position.
Figure 4:
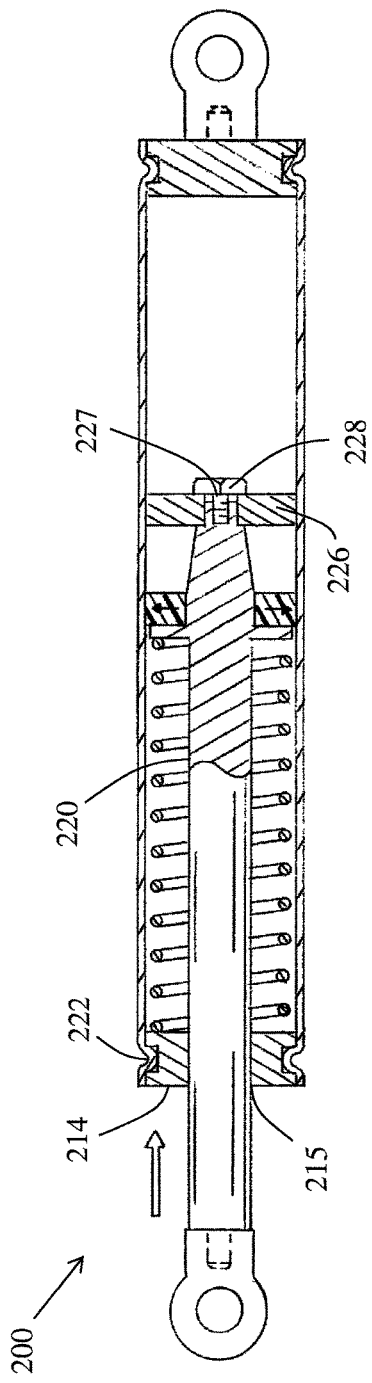
FIG. 4 is a side cross-sectional view of FIG. 3 wherein the spring rod is moving to the fully retracted position.

Referring now to FIGS. 3-4, there is illustrated another spring system 200 which is similar to the spring system of FIGS. 1-2 except that the variable section has a different orientation and the mechanical spring is positioned on the opposite side of the piston or guide bushing. As such, many of the components and features of spring system 200 are the same or similar to the spring system of FIGS. 1-2, thus will not be repeated in detail when describing the spring system of FIGS. 3-4.

Spring system 200 includes a compressible sleeve 210, a housing body 202 having an internal cavity 204, and a rod 220. The internal cavity has an inner surface. The rod is configured to move along the longitudinal axis of the housing body between a fully retracted and fully extended position. The rear end 202b of housing body 202 includes a plug 206. The rear end 202b of the housing body includes a connection arrangement 212 to facilitate in connecting the rear end of the spring system to a fixture or other structure. The front end 202a of the housing body includes a bushing 214. Bushing 214 includes an opening 215 to enable at least a portion of the rod to move through the bushing along the longitudinal axis of the housing body. Rod 220 is configured to extend at least partially outwardly from the front end 202a of the housing body. Front flanges 222 in the housing body are used to facilitate in securing the bushing to the housing body. The front end of rod 220 includes a connection arrangement 224. Rod 220 includes a piston or guide bushing 226 connected to the rear portion of the rod. The piston or guide bushing 226 includes a hole 227 wherein the body of a screw 228 is inserted therethrough so as to secure the piston or guide bushing to the end of the rod. A spring arrangement in the form of a mechanical spring 230 is positioned in the internal cavity of the housing body. The mechanical spring 230 is positioned between the piston and the front end of the housing body. A first end of the mechanical spring can be connected to bushing 214 and the second end can be connected to stop 218; however, it can be appreciated that only one end or no end of the spring is connected to the bushing or the stop. The mechanical spring is positioned in the internal cavity to bias the rod in a partial or fully retracted position. As can be appreciated, one or both sides of the piston or guide bushing can include more than one mechanical spring. As can also be appreciated, one or both sides of the piston or guide bushing can be absent a mechanical spring. As can also be appreciated, the spring arrangement can include a fluid (e.g., liquid and/or gas) that can be used in combination with the mechanical spring or can be substituted for the mechanical spring. Compressible sleeve 210 is positioned in the internal cavity between stop 218 and the piston or guide bushing 226. Variable section 221 of rod 220 decreases in cross-sectional size from the stop 218 to the piston or guide bushing 226. The decrease in cross-sectional area of the rod from the stop to the piston or guide bushing 226 is illustrated as being non-continuous; however, this is not required. The outer peripheral edge of the stop and the outer peripheral edge of the piston or guide bushing are positioned at or closely adjacent to the inner surface of the interior cavity. The stop can cooperate with the piston or guide bushing in functioning as maintaining the position of the rod in the interior cavity as the rod moves between the fully extended and retracted positions, and/or can form a partial or full fluid seal in the interior cavity. The outer peripheral edge of the compressible sleeve is also illustrated as being positioned at or closely adjacent to the inner surface of the interior cavity. As such, the compressible sleeve can also or alternatively be used with the stop and/or the piston or guide bushing in functioning as maintaining the position of the rod in the interior cavity as the rod moves between the fully extended and retracted positions, and/or can form a partial or full fluid seal in the interior cavity.

Referring now to FIG. 3, the rod is illustrated as being moved toward the fully extended position. As the rod moves toward the fully extended position, spring 230 is caused to compress and the compressible sleeve is caused to move along the variable section toward piston or guide bushing 210. When the compressible sleeve is located adjacent to the piston or guide bushing, the cross-sectional area of variable section 221 is at its smallest value and thus causes no, or the smallest amount of, deformation of the compressible sleeve when in such position. In one non-limiting configuration, all or a portion of the outer surface of the compressible sleeve, when the compressible sleeve is located adjacent to the piston or the guide bushing, can be spaced from inner surface of the interior cavity and thus not be in a compressed state, or the outer surface of the compressible sleeve can be in contact with the inner surface of the interior cavity and thus be in a compressed state or be in a state just prior to the compression of the compressible sleeve; however, this is not required.

Referring now to FIG. 4, when the rod moves toward the fully retracted position, spring 230 is caused to expand and the compressible sleeve is caused to move along the variable section 221 toward stop 218. As the compressible sleeve moves toward stop 218, the cross-sectional area of variable section 221 increases, thereby causing the compressible sleeve to compress and deform and exert a pressure on the inner surface of the interior cavity (as illustrated by the arrows), which pressure increases the frictional force between the compressible sleeve and the inner surface of the interior cavity. The amount of force needed to cause the rod to continue to move toward the fully retracted position continues to increase until the compressible sleeve is positioned adjacent to the stop as illustrated in FIG. 4. As such, the length and shape of the variable portion in combination with the size, shape, thickness and material of the compressible sleeve can be selected to create customized force profiles required to move the rod between the fully extended and fully retracted positions. The use or one or more mechanical springs and/or fluid in the interior cavity can also be used to customize the force profiles of the spring system.

When the compressible sleeve is positioned adjacent to stop 218, and the rod is moved toward the fully extended position, the compressible sleeve is caused to move toward the piston or guide bushing 226. As the compressible sleeve moves toward the piston or guide bushing 226, the amount of friction force between the compressible sleeve and the inner surface of the interior cavity decreases; thus, the force required to continue to move the rod toward the fully extended position also decreases. The amount of friction continues to decrease until the compressible sleeve is positioned adjacent to piston or guide bushing 226 as illustrated in FIG. 4.

Figure 5:
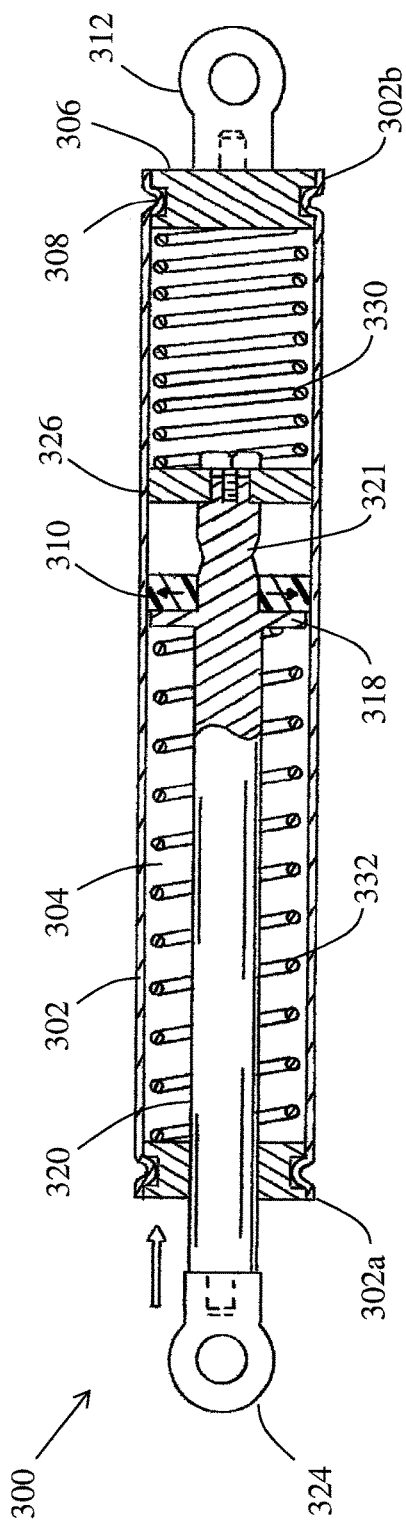
FIG. 5 illustrates a side cross-sectional view of another non-limiting spring system in accordance with the present invention wherein the spring rod is moving toward the fully retracted position.
Figure 6:
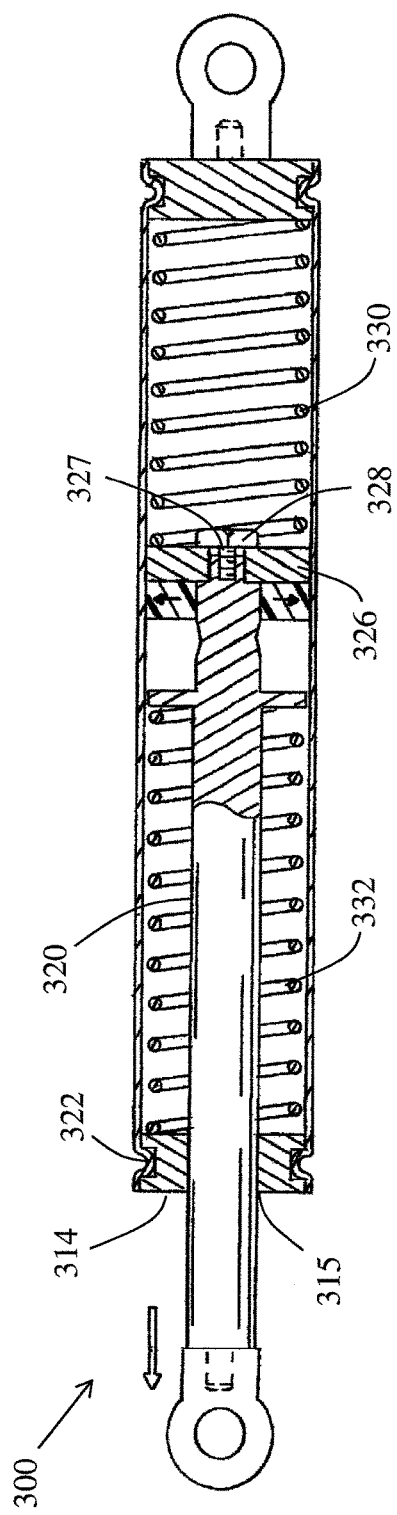
FIG. 6 is a side cross-sectional view of FIG. 5 wherein the spring rod is moving toward the fully extended position.

Referring now to FIGS. 5-6, there is illustrated another spring system 300 which is similar to the spring system of FIGS. 1-4 except that the variable section has a different orientation and a mechanical spring is positioned on both sides of the piston or guide bushing. As such, many of the components and features of spring system 300 are the same or similar to the spring systems of FIGS. 1-4, thus will not be repeated in detail when describing the spring system of FIGS. 5-6.

Spring system 300 includes a compressible sleeve 310, a housing body 302 having an internal cavity 304, and a rod 320. The internal cavity has an inner surface. The rod is configured to move along the longitudinal axis of the housing body between a fully retracted and fully extended position. The rear end 302b of housing body 302 includes a plug 306. The rear end 302b of the housing body includes a connection arrangement 312 to facilitate in connecting the rear end of the spring system to a fixture or other structure. The front end 302a of the housing body includes a bushing 314. Bushing 314 includes an opening 315 to enable at least a portion of the rod to move through the bushing along the longitudinal axis of the housing body. Rod 320 is configured to extend at least partially outwardly from the front end 302a of the housing body. Front flanges 322 in the housing body are used to facilitate in securing the bushing to the housing body. The front end of rod 320 includes a connection arrangement 324. Rod 320 includes a piston or guide bushing 326 connected to the rear portion of the rod. The piston or guide bushing 326 includes a hole 327 wherein the body of a screw 328 is inserted therethrough so as to secure the piston or guide bushing to the end of the rod. A spring arrangement in the form of mechanical springs 330, 332 is positioned in the internal cavity of the housing body. Mechanical spring 330 is positioned between the piston or guide bushing and the rear end of the housing body. Mechanical spring 332 is positioned between the piston or guide bushing and the front end of the housing body. A first end of the mechanical spring 330 can be connected to plug 306 and the second end can be connected to the piston or guide 326; however, it can be appreciated that only one end or no end of the spring is connected to the plug or piston. A first end of the mechanical spring 332 can be connected to bushing 314 and the second end can be connected to stop 318; however, it can be appreciated that only one end or no end of the spring is connected to the bushing or the stop. Mechanical spring 330 is positioned in the internal cavity to bias the rod in a partial or fully extended position. Mechanical spring 332 is positioned in the internal cavity to bias the rod in a partial or fully retracted position. Mechanical springs 330 and 332 can have the same or different length, material, windings, cross-sectional shape, cross-sectional area, winding direction, and/or spring rate. As can be appreciated, one or both sides of the piston or guide bushing can include more than one mechanical spring. As can also be appreciated, one or both sides of the piston or guide bushing can be absent a mechanical spring. As can also be appreciated, the spring arrangement can include a fluid (e.g., liquid and/or gas) that can be used in combination with the mechanical spring or can be substituted for the mechanical spring. Compressible sleeve 310 is positioned in the internal cavity between stop 318 and the piston or guide bushing 326. Variable section 321 of rod 320 decreases in cross-sectional size from the stop 318 to a middle portion of the variable section and then increases the cross-sectional area from the middle portion to the piston or guide bushing 326; however, this is not required. The variable cross-sectional area can be along the complete variable section or only in a portion of the variable section. As illustrated in FIGS. 5-6, the cross-sectional side profile of the variable section is generally V-shaped; however, it can be appreciated that the cross-sectional side profile of the variable section can have many of shapes (e.g., S-shaped, W-shaped, C-shaped, etc.). In the particular configuration of the variable section of FIGS. 5-6, the cross-sectional area of the variable section is larger adjacent to stop 318 and the piston or guide bushing 326 than the cross-sectional area of the variable section between the stop and the piston or guide. As can be appreciated, variable section can have a reverse configuration wherein the cross-sectional area of the variable section is smaller adjacent to stop 318 and the piston or guide bushing 326 than the cross-sectional area of the variable section between the stop and the piston or guide. The outer peripheral edge of the stop and the outer peripheral edge of the piston or guide bushing are positioned at or closely adjacent to the inner surface of the interior cavity. The stop can cooperate with the piston or guide bushing in functioning as maintaining the position of the rod in the interior cavity as the rod moves between the fully extended and retracted positions, and/or can form a partial or full fluid seal in the interior cavity. The outer peripheral edge of the compressible sleeve is also illustrated as being positioned at or closely adjacent to the inner surface of the interior cavity. As such, the compressible sleeve can also or alternatively be used with the stop and/or the piston or guide bushing in functioning as maintaining the position of the rod in the interior cavity as the rod moves between the fully extended and retracted positions, and/or can form a partial or full fluid seal in the interior cavity.

Referring now to FIG. 5, the rod is illustrated as being moved toward the fully retracted position. As the rod moves toward the fully retracted position, the length spring 332 expands and the length of spring 330 is compressed. Also, the compressible sleeve is caused to move along the variable section toward stop 318. When the compressible sleeve is located adjacent to stop 318, the cross-sectional area of variable section 321 is a greater value than when the compressible sleeve is located in the middle region of the variable section, causing the compressible sleeve to compress and deform and exert a pressure on the inner surface of the interior cavity (as illustrated by the arrows), which pressure increases the frictional force between the compressible sleeve and the inner surface of the interior cavity.

When the rod is moved toward the fully retracted position as illustrated in FIG. 6, the length spring 330 expands and the length of spring 332 is compressed. Also, the compressible sleeve is caused to move along the variable section toward the piston or guide 326. When the compressible sleeve is located adjacent to the piston or guide 326, the cross-sectional area of variable section 321 is a greater value than when the compressible sleeve is located in the middle region of the variable section, causing the compressible sleeve to compress and deform and exert a pressure on the inner surface of the interior cavity (as illustrated by the arrows), which pressure increases the frictional force between the compressible sleeve and the inner surface of the interior cavity.

During the movement of the rod between the fully expanded and retracted positions, the compressible sleeve is caused to move to the middle region of variable section 321. When the compressible sleeve is located in the middle section that has the smallest cross-sectional area, such region of the variable section causes no, or the smallest amount of, deformation of the compressible sleeve. In one non-limiting configuration, all or a portion of the outer surface of the compressible sleeve, when in such middle region, can be spaced from inner surface of the interior cavity and thus not be in a compressed state, or the outer surface of the compressible sleeve can be in contact with the inner surface of the interior cavity and thus be in a compressed state or be in a state just prior to the compression of the compressible sleeve; however, this is not required.

When the rod is positioned in the fully retracted position and the compressible sleeve is located adjacent to stop 318, the amount of force needed to cause the rod to move toward the fully extended position (when springs 330 and 332 are the same) initially decreases as the compressible sleeve moves into the middle region of the variable section and then increases as the compressible sleeve moves from the middle section to the piston or guide bushing. When the rod is positioned in the fully extended position and the compressible sleeve is located adjacent to the piston or guide bushing, the amount of force needed to cause the rod to move toward the fully retracted position (when springs 330 and 332 are the same) initially decreases as the compressible sleeve moves into the middle region of the variable section and then increases as the compressible sleeve moves from the middle section to stop 318. As such, the length and shape of the variable portion in combination with the size, shape, thickness and material of the compressible sleeve can be selected to create customized force profiles required to move the rod between the fully extended and fully retracted positions. The use or one or more mechanical springs and/or fluid in the interior cavity can also be used to customize the force profiles of the spring system.

Referring now to FIGS. 7-8, there is illustrated another spring system 400 which is similar to the spring system of FIGS. 1-6 except that the variable section is absent from the rod, the spacing between the stop and piston or guide bushing is different, and one more interference structures exist on the inner surface of the interior cavity of the housing body. As such, many of the components and features of spring system 400 are the same or similar to the spring systems of FIGS. 1-6, thus will not be repeated in detail when describing the spring system of FIGS. 7-8.

Spring system 400 includes a compressible sleeve 410, a housing body 402 having an internal cavity 404, and a rod 420. The internal cavity has an inner surface 405. The rod is configured to move along the longitudinal axis of the housing body between a fully retracted and fully extended position. The rear end 402b of housing body 402 includes a plug 406. The rear end 402b of the housing body includes a connection arrangement 412 to facilitate in connecting the rear end of the spring system to a fixture or other structure. The front end 402a of the housing body includes a bushing 414. Bushing 414 includes an opening 415 to enable at least a portion of the rod to move through the bushing along the longitudinal axis of the housing body. Rod 420 is configured to extend at least partially outwardly from the front end 402a of the housing body. Front flanges 422 in the housing body are used to facilitate in securing the bushing to the housing body. The front end of rod 420 includes a connection arrangement 424. Rod 420 includes a piston or guide bushing 426 connected to the rear portion of the rod. The piston or guide bushing 426 includes a hole 427 wherein the body of a screw 428 is inserted therethrough so as to secure the piston or guide bushing to the end of the rod. A spring arrangement in the form of a mechanical spring 430 is positioned in the internal cavity of the housing body. The mechanical spring 430 is positioned between the piston or guide bushing and the rear end of the housing body. A first end of the mechanical spring can be connected to plug 406 and the second end can be connected to the piston or guide bushing; however, it can be appreciated that only one end or no end of the spring is connected to the plug or the piston or guide bushing. The mechanical spring is positioned in the internal cavity to bias the rod in a partial or fully extended position. As can be appreciated, one or both sides of the piston or guide bushing can include more than one mechanical spring. As can also be appreciated, one or both sides of the piston or guide bushing can be absent a mechanical spring. As can also be appreciated, the spring arrangement can include a fluid (e.g., liquid and/or gas) that can be used in combination with the mechanical spring or can be substituted for the mechanical spring. Compressible sleeve 410 is positioned in the internal cavity between stop 418 and the piston or guide bushing 426. The spacing between the stop and the piston or guide bushing is selected to be the same as the width of the compressible sleeve so as to inhibit or prevent the compressible sleeve from moving along the longitudinal length of the rod as the rod moves between the fully retracted and extended positions. As can be appreciated, the spacing between the stop and the piston or guide bushing can be less than the width of the compressible sleeve or slightly greater than the width of the compressible sleeve. The cross-sectional area and cross-sectional shape of the rod that is located between the stop and the piston or guide bushing is illustrated as being constant; however, this is not required. The outer peripheral edge of stop 418 is illustrated as being spaced a greater distance from the inner surface of the interior cavity than the stop illustrated in FIGS. 1-6; however, this is not required. Likewise, the outer peripheral edge of the piston or guide bushing is illustrated as being spaced a greater distance from the inner surface of the interior cavity than the piston or guide bushing illustrated in FIGS. 1-6; however, this is not required. In the arrangement illustrated in FIGS. 7-8, the compressible sleeve functions as maintaining the position of the rod in the interior cavity as the rod moves between the fully extended and retracted positions, and/or can form a partial or full fluid seal in the interior cavity.

Referring now to FIG. 7, the rod is illustrated as being moved toward the fully extended position. As the rod moves toward the fully extended position, spring 430 is caused to expand. As the rod continues its movement toward the fully extended position, the outer surface of the compressible sleeve eventually contacts interference structure 416. Interference structure 416 can be a structure that is connected to the inner surface of the interior cavity as illustrated in FIGS. 7-8 and/or can be a structure formed by the housing body as illustrated in FIGS. 9-10. When the interference structure 416 is a separate structure connected to the inner surface of the interior cavity, the separate structure can be connected to the inner surface by any means (e.g., adhesive, friction fit, screw, rivet, bolt, weld bead, solder, melted bond, etc.). The material of the interference structure is non-limiting (e.g., metal, resin, plastic, composite material, wood, ceramic glass, etc.). The size and shape of the interference structure and the number of interference structures in the interior cavity are non-limiting. As illustrated in FIGS. 7-8, a single interference structure is positioned in the interior cavity. The interference structure is positioned off-center along the longitudinal length of the interior cavity; however, this is not required. The cross-sectional shape of the interference structure is illustrated as a general V-shape wherein there are two sloped sides that connect at the maximum thickness of the interference structure; however, it can be appreciate that many other cross-sectional shapes can be used (e.g., U-shaped, etc.). The sloped sides are illustrated has having the same longitudinal length and shape; however, this is not required. One or more portions of the outer surface of the interference structure and/or the outer surface of the compressible sleeve can include a coating or material that increases or reduces the friction between the interference structure and the outer surface of the compressible sleeve; however, this is not required.

As illustrated in FIG. 8, when the compressible sleeve contacts the interference structure 416, the compressible sleeve is caused to deform and compress and exert a pressure on the inner surface of the interior cavity (as illustrated by the arrows), which pressure increases the frictional force between the compressible sleeve and the inner surface of the interior cavity. The amount of force needed to cause the rod to continue to move toward the fully extended position continues to increase until the compressible sleeve moves to or past the thickest point of the interference structure. When the compressible sleeve moves past the thickest point of the interference structure, the amount of compression and/or deformation of the compressible sleeve decreases, thus reducing the amount of friction between the compressible sleeve and the inner surface of the interior cavity. The reduction in friction results is less force required to cause the rod to move past the interference structure. As such, the length and shape of the interference structure and the number of interference structures in combination with the size, shape, thickness and material of the compressible sleeve can be selected to create customized force profiles required to move the rod between the fully extended and fully retracted positions. The use or one or more mechanical springs and/or fluid in the interior cavity can also be used to customize the force profiles of the spring system. When the compressible sleeve is not in contact with the interference structure, all or a portion of the outer surface of the compressible sleeve can be spaced from the inner surface of the interior cavity and thus not be in a compressed state, or the outer surface of the compressible sleeve can be in contact with the inner surface of the interior cavity, and thus be in a compressed state or be in a state just prior to the compression of the compressible sleeve; however, this is not required.

Referring now to FIGS. 9-10, there is illustrated another spring system 500 which is similar to the spring system of FIGS. 7-8 except that the interior cavity includes multiple interference structures on the inner surface and that the interference structures are formed by the housing body and not from a separate structure connected to the housing body. The other components of the spring system 500 of FIGS. 9-10 are also similar to the components and features of spring systems of FIGS. 1-8, thus will not be repeated in detail when describing the spring system of FIGS. 9-10.

Spring system 500 includes a compressible sleeve 510, a housing body 502 having an internal cavity 504*m* and a rod 520. The internal cavity has an inner surface 505. The rod is configured to move along the longitudinal axis of the housing body between a fully retracted and fully extended position. The rear end 502*b* of housing body 502 includes a plug 506. The rear end 502*b* of the housing body includes a connection arrangement 512 to facilitate in connecting the rear end of the spring system to a fixture or other structure. The front end 502*a* of the housing body includes a bushing 514. Bushing 514 includes an opening 515 to enable at least a portion of the rod to move through the bushing along the longitudinal axis of the housing body. Rod 520 is configured to extend at least partially outwardly from the front end 502*a* of the housing body. Front flanges 522 in the housing body are used to facilitate in securing the bushing to the housing body. The front end of rod 520 includes a connection arrangement 524. Rod 520 includes a piston or guide bushing 526 connected to the rear portion of the rod. The piston or guide bushing 526 includes a hole 527 wherein the body of a screw 528 is inserted therethrough so as to secure the piston or guide bushing to the end of the rod. A spring arrangement in the form of a mechanical spring 530 is positioned in the internal cavity of the housing body. The mechanical spring 530 is positioned between the piston or guide bushing and the rear end of the housing body. A first end of the mechanical spring can be connected to plug 506 and the second end can be connected to the piston or guide bushing; however, it can be appreciated that only one end or no end of the spring is connected to the plug or the piston or guide bushing. The mechanical spring is positioned in the internal cavity to bias the rod in a partial or fully extended position. As can be appreciated, one or both sides of the piston or guide bushing can include more than one mechanical spring. As can also be appreciated, one or both sides of the piston or guide bushing can be absent a mechanical spring. As can also be appreciated, the spring arrangement can include a fluid (e.g., liquid and/or gas) that can be used in combination with the mechanical spring or can be substituted for the mechanical spring. Compressible sleeve 510 is positioned in the internal cavity between stop 518 and the piston or guide bushing 526. The spacing between the stop and the piston or guide bushing is selected to be the same as the width of the compressible sleeve so as to inhibit or prevent the compressible sleeve from moving along the longitudinal length of the rod as the rod moves between the fully retracted and extended positions. As can be appreciated, the spacing between the stop and the piston or guide bushing can be less than the width of the compressible sleeve or slightly greater than the width of the compressible sleeve. The cross-sectional area and cross-sectional shape of the rod that is located between the stop and the piston or guide bushing is illustrated as being constant; however, this is not required. The outer peripheral edge of stop 418 is illustrated as being spaced a greater distance from the inner surface of the interior cavity than the stop illustrated in FIGS. 1-6; however, this is not required. Likewise, the outer peripheral edge of piston or guide bushing is illustrated as being spaced a greater distance from the inner surface of the interior cavity than the piston or guide bushing illustrated in FIGS. 1-6; however, this is not required. In the arrangement illustrated in FIGS. 9-10, the compressible sleeve functions as maintaining the position of the rod in the interior cavity as the rod moves between the fully extended and retracted positions, and/or can form a partial or full fluid seal in the interior cavity.

Referring now to FIG. 9, the rod is illustrated as being moved toward the fully extended position. As the rod moves toward the fully extended position, spring 530 is caused to expand. As the rod continues its movement toward the fully extended position, the outer surface of the compressible sleeve eventually contacts interference structure 517. Interference structure 517 is illustrated as being a depression formed in the housing body. A second interference structure 516 is spaced longitudinal from interference structure 517. This second inference structure can also be formed by a depression in the housing body. As can be appreciated, the second interference structure can be formed by a separate structure located in the interior cavity as described above with reference to FIGS. 7-8; however, this is not required. The size and shape of the interference structures and the number of interference structures in the interior cavity are non-limiting. As illustrated in FIGS. 9-10, interference structure 517 is generally positioned in the center of the longitudinal length of the interior cavity and inference structure 516 is positioned off-center along the longitudinal length of the interior cavity; however, it will be appreciated that the position of the one or more inference structures along the longitudinal length of the interior cavity is non-limiting. The cross-sectional shape and size of the two interference structures can be the same or different. As illustrated in FIGS. 9-10, the size and shape of the two inference structures are different. Both inference structures have a general U-shape, but the U-shapes are formed differently. Interference structure 517 extends farther into the interior of the internal cavity than interference structure 516, thus interference structure 517 is configured to cause more compression and deformation of the compressible sleeve as the compressible sleeve passes over interference structure 517 than when the compressible sleeve passes over interference structure 516; however, this is not required. One or more portions of the outer surface of the interference structure and/or the outer surface of the compressible sleeve can include a coating or material that increases or reduces the friction between the interference structure and the outer surface of the compressible sleeve; however, this is not required.

As illustrated in FIG. 10, when the compressible sleeve contacts the interference structure 517, the compressible sleeve is caused to deform and compress and exert a pressure on the inner surface of the interior cavity (as illustrated by the arrows), which pressure increases the frictional force between the compressible sleeve and the inner surface of the interior cavity. The amount of force needed to cause the rod to continue to move toward the fully extended position continues to increase until the compressible sleeve moves to or past the thickest point of the interference structure. When the compressible sleeve moves past the thickest point of the interference structure, the amount of compression and/or deformation of the compressible sleeve decreases, thus reducing the amount of friction between the compressible sleeve and the inner surface of the interior cavity. The reduction in friction results in less force required to cause the rod to move past the interference structure. The same occurs as the compressible sleeve passes over interference structure 516. As such, the length and shape of the interference structure and the number of interference structures in combination with the size, shape, thickness and material of the compressible sleeve can be selected to create customized force profiles required to move the rod between the fully extended and fully retracted positions. The use or one or more mechanical springs and/or fluid in the interior cavity can also be used to customize the force profiles of the spring system. When the compressible sleeve is not in contact with the interference structure, all or a portion of the outer surface of the compressible sleeve can be spaced from the inner surface of the interior cavity and thus not be in a compressed state, or the outer surface of the compressible sleeve can be in contact with the inner surface of the interior cavity, and thus be in a compressed state or be in a state just prior to the compression of the compressible sleeve; however, this is not required.

Figure 11:
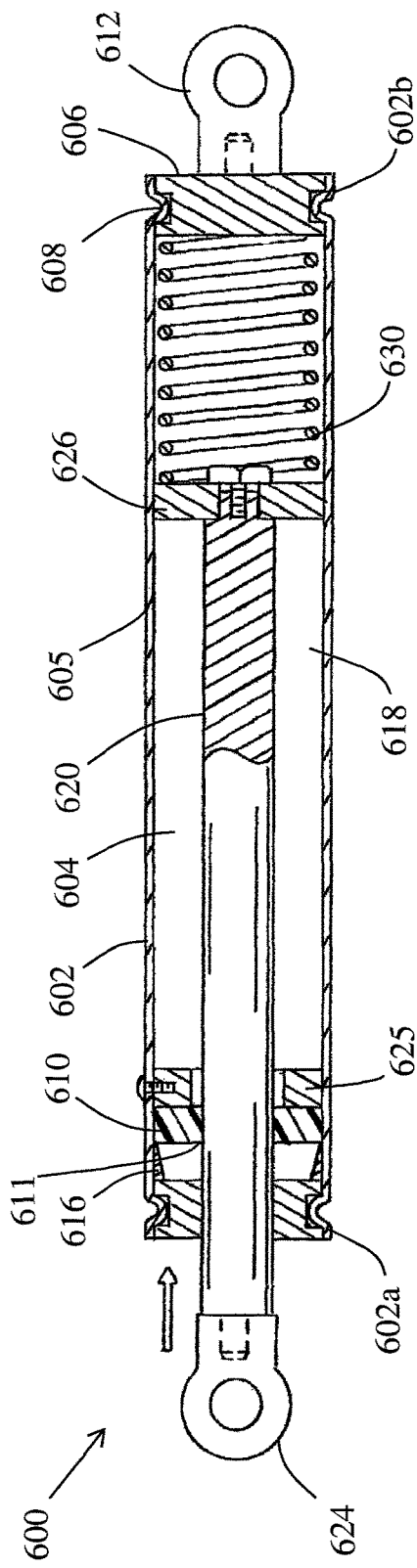
FIG. 11 illustrates a side cross-sectional view of another non-limiting spring system in accordance with the present invention wherein the spring rod is moving toward the fully retracted position.
Figure 12:
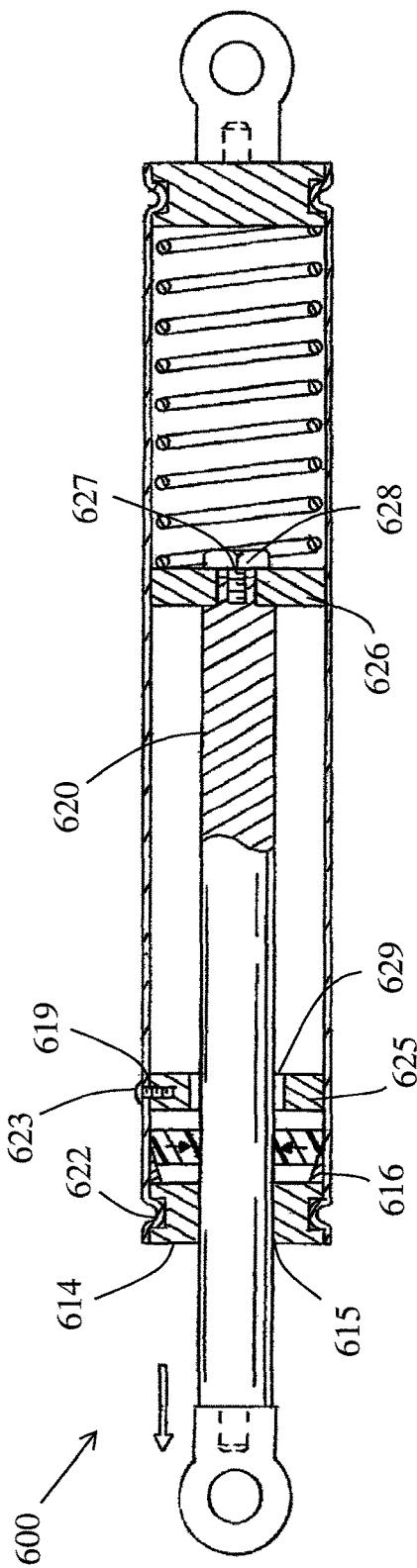
FIG. 12 is a side cross-sectional view of FIG. 11 wherein the spring rod is moving toward the fully extended position.

Referring now to FIGS. 11-12, there is illustrated another spring system 600 which is similar to the spring system of FIGS. 1-6 except that the variable section is absent from the rod, a stop is not connected to the rod, and one more interference structures exist on the inner surface of the interior cavity of the housing body. Many of the components and features of spring system 600 are the same or similar to the spring systems of FIGS. 1-8, thus will not be repeated in detail when describing the spring system of FIGS. 11-12.

Spring system 600 includes a compressible sleeve 610, a housing body 602 having an internal cavity 604, and a rod 620. The internal cavity has an inner surface 605. The rod is configured to move along the longitudinal axis of the housing body between a fully retracted and fully extended position. The rear end 602*b* of housing body 602 includes a plug 606. The rear end 602*b* of the housing body includes a connection arrangement 612 to facilitate in connecting the rear end of the spring system to a fixture or other structure. The front end 602*a* of the housing body includes a bushing 614. Bushing 614 includes an opening 615 to enable at least a portion of the rod to move through the bushing along the longitudinal axis of the housing body. Rod 620 is configured to extend at least partially outwardly from the front end 602*a* of the housing body. Front flanges 622 in the housing body are used to facilitate in securing the bushing to the housing body. The front end of rod 620 includes a connection arrangement 624. Rod 620 includes a piston or guide bushing 626 connected to the rear portion of the rod. The piston or guide bushing 626 includes a hole 627 wherein the body of a screw 628 is inserted therethrough so as to secure the piston or guide bushing to the end of the rod. A spring arrangement in the form of a mechanical spring 630 is positioned in the internal cavity of the housing body. The mechanical spring 630 is positioned between the piston or guide bushing and the rear end of the housing body. A first end of the mechanical spring can be connected to plug 606 and the second end can be connected to the piston or guide bushing; however, it can be appreciated that only one end or no end of the spring is connected to the plug or the piston or guide bushing. The mechanical spring is positioned in the internal cavity to bias the rod in a partial or fully extended position. As can be appreciated, one or both sides of the piston or guide bushing can include more than one mechanical spring. As can also be appreciated, one or both sides of the piston or guide bushing can be absent a mechanical spring. As can also be appreciated, the spring arrangement can include a fluid (e.g., liquid and/or gas) that can be used in combination, with the mechanical spring or can be substituted for the mechanical spring.

Compressible sleeve 610 is positioned in the internal cavity between bushing 614 and stop 625. Stop 635 is connected to the inner surface of the interior cavity of the housing body and includes an opening 629 that is configured to allow the rod to pass therethrough. The size and shape of opening 629 are non-limiting. As illustrated in FIGS. 11-12, the opening is configured such that the rod is spaced from the sides of the opening; however, this is not required. As can be appreciated, the size and shape of the opening can be selected such that all or a portion of the outer surface that passes through the opening contacts the surface of the opening; however, this is not required. In such an arrangement, a fluid seal can be partially or fully formed between the stop and the rod; however, this is not required.

The material used to form the stop (e.g., metal, plastic, resin, glass, ceramic, composite material, etc.), and the shape and size of the stop are non-limiting. The means by which the stop is connected to the inner surface of the internal cavity is also non-limiting (e.g., adhesive, friction fit, rivet, weld bead, solder, melted bond, etc.). As illustrated in FIGS. 11-12, the outer surface of the stop includes a connection opening 619 that is configured to receive a screw 623 to secure the stop to the inner surface of the internal cavity.

The spacing between stop 625 and bushing 614 is selected to be greater than the width of the compressible sleeve so that the compressible sleeve can move at least partially along the longitudinal length of the internal cavity as the rod moves between the fully retracted and extended positions. The cross-sectional area and cross-sectional shape of the rod is illustrated as being constant; however, this is not required.

Compressible sleeve 610 includes an opening 611 that is configured to allow the rod to pass therethrough. The size and shape of opening 611 are non-limiting. As illustrated in FIGS. 11-12, the opening is configured such that the rod contacts the sides of the opening; however, this is not required. In such an arrangement, a fluid seal can be partially or fully formed between the compressible sleeve and the rod; however, this is not required. As can be appreciated, the size and shape of the opening can be selected such that all or a portion of the outer surface that passes through the opening is spaced from the surface of the opening; however, this is not required.

Referring now to FIG. 12, the rod is illustrated as being moved toward the fully extended position. As the rod moves toward the fully extended position, spring 630 is caused to expand. As the rod continues its movement toward the fully extended position, the outer surface of the compressible sleeve is caused to engage interference structure 616. Interference structure 616 can be a structure that is connected to the inner surface of the interior cavity as illustrated in FIGS. 11-12 and/or can be a structure formed by the housing body as illustrated in FIGS. 9-10. When the interference structure 616 is a separate structure connected to the inner surface of the interior cavity, the separate structure can be connected to the inner surface by any means (e.g., adhesive, friction fit, screw, rivet, bolt, weld bead, solder, melted bond, etc.). The material of the interference structure is non-limiting (e.g., metal, resin, plastic, composite material, wood, ceramic glass, etc.). The size and shape of the interference structure and the number of interference structures in the interior cavity are non-limiting. As illustrated in FIGS. 11-12, a single interference structure is positioned in the interior cavity. The interference structure is positioned adjacent to bushing 614; however, this is not required. The shape of the interference structure is illustrated as a right angle triangle that slopes downwardly from bushing 614 and terminates at a location that is spaced from stop 625; however, it can be appreciated that the interference structure can terminate at stop 625. The downward slope is illustrated as being a constant slope angle; however, this is not required. One or more portions of the outer surface of the interference structure and/or the outer surface of the compressible sleeve can include a coating or material that increases or reduces the friction between the interference structure and the outer surface of the compressible sleeve; however, this is not required.

As illustrated in FIG. 12, when the rod is moved toward the fully extended position and the rod causes the compressible sleeve to move toward and contact interference structure 616, the compressible sleeve is caused to deform and compress and exert a pressure on the rod and/or interference structure (as illustrated by the arrows), which pressure increases the frictional force between the compressible sleeve and the rod and/or inner surface of the interior cavity. The amount of force needed to cause the rod to continue to move toward the fully extended position continues to increase until the compressible sleeve moves adjacent to bushing 614.

Referring now to FIG. 11, when the rod is moved toward the fully retracted position, the movement of the rod causes the compressible sleeve to move toward stop 625 and off of interference structure 616. As the compressible sleeve moves away from bushing 614, the compressible sleeve reduces in compression and deformation due to the downward cross-sectional slope of the interference structure. As such, the amount of force needed to cause the rod to continue to move toward the fully retracted position continues to decrease until the compressible sleeve moves off of the interference structure and/or is adjacent to stop 625. When the compressible sleeve is not in contact with the interference structure, all or a portion of the outer surface of the compressible sleeve can be spaced from the inner surface of the interior cavity and thus not be in a compressed state, or the outer surface of the compressible sleeve can be in contact with the inner surface of the interior cavity, and thus be in a compressed state or be in a state just prior to the compression of the compressible sleeve; however, this is not required. As such, the length and shape of the interference structure and the number of interference structures in combination with the size, shape, thickness and material of the compressible sleeve can be selected to create customized force profiles required to move the rod between the fully extended and fully retracted positions. The use or one or more mechanical springs and/or fluid in the interior cavity can also be used to customize the force profiles of the spring system.

Referring now to FIGS. 13-14, there is illustrated another spring system 700 which is similar to the spring system of FIGS. 11-12 except for the orientation and location of the interference structure in the interior cavity of the housing body. Many of the components and features of spring system 700 are the same or similar to the spring systems of FIGS. 1-8 and 11-12, thus will not be repeated in detail when describing the spring system of FIGS. 13-14.

Spring system 700 includes a compressible sleeve 710, a housing body 702 having an internal cavity 704, and a rod 720. The internal cavity has an inner surface 705. The rod is configured to move along the longitudinal axis of the housing body between a fully retracted and fully extended position. The rear end 702b of housing body 702 includes a plug 706. The rear end 702b of the housing body includes a connection arrangement 712 to facilitate in connecting the rear end of the spring system to a fixture or other structure. The front end 702a of the housing body includes a bushing 714. Bushing 714 includes an opening 715 to enable at least a portion of the rod to move through the bushing along the longitudinal axis of the housing body. Rod 720 is configured to extend at least partially outwardly from the front end 702a of the housing body. Front flanges 722 in the housing body are used to facilitate in securing the bushing to the housing body. The front end of rod 720 includes a connection arrangement 724. Rod 720 includes a piston or guide bushing 726 connected to the rear portion of the rod. The piston or guide bushing 726 includes a hole 727 wherein the body of a screw 728 is inserted therethrough so as to secure the piston or guide bushing to the end of the rod. A spring arrangement in the form of a mechanical spring 730 is positioned in the internal cavity of the housing body. The mechanical spring 730 is positioned between the piston or guide bushing and the rear end of the housing body. A first end of the mechanical spring can be connected to plug 706 and the second end can be connected to the piston or guide bushing; however, it can be appreciated that only one end or no end of the spring is connected to the plug or the piston or guide bushing. The mechanical spring is positioned in the internal cavity to bias the rod in a partial or fully extended position. As can be appreciated, one or both sides of the piston or guide bushing can include more than one mechanical spring. As can also be appreciated, one or both sides of the piston or guide bushing can be absent a mechanical spring. As can also be appreciated, the spring arrangement can include a fluid (e.g., liquid and/or gas) that can be used in combination with the mechanical spring or can be substituted for the mechanical spring.

Compressible sleeve 710 is positioned in the internal cavity between bushing 714 and stop 725. Stop 735 is connected to the inner surface of the interior cavity of the housing body and includes an opening 729 that is configured to allow the rod to pass therethrough. The size and shape of opening 729 are non-limiting. As illustrated in FIGS. 13-14, the opening is configured such that the rod is spaced from the sides of the opening; however, this is not required. As illustrated in FIGS. 13-14, the outer surface of the stop includes a connection opening 719 that is configured to receive a screw 723 to secure the stop to the inner surface of the internal cavity.

The spacing between stop 725 and bushing 714 is selected to be greater than the width of the compressible sleeve so that the compressible sleeve can move at least partially along the longitudinal length of the internal cavity as the rod moves between the fully retracted and extended positions. The cross-sectional area and cross-sectional shape of the rod is illustrated as being constant; however, this is not required.

Compressible sleeve 710 includes an opening 711 that is configured to allow the rod to pass therethrough. The size and shape of opening 711 are non-limiting. As illustrated in FIGS. 13-14, the opening is configured such that the rod contacts the sides of the opening; however, this is not required.

Referring now to FIG. 14, the rod is illustrated as being moved toward the fully extended position. As the rod moves toward the fully extended position, spring 730 is caused to expand. As the rod continues its movement toward the fully extended position, the outer surface of the compressible sleeve is caused to disengage from interference structure 716. Interference structure 716 can be a structure that is connected to the inner surface of the interior cavity as illustrated in FIGS. 13-14 and/or can be a structure formed by the housing body as illustrated in FIGS. 9-10. When the interference structure 716 is a separate structure connected to the inner surface of the interior cavity, the separate structure can be connected to the inner surface by any means. The material of the interference structure is non-limiting. The size and shape of the interference structure and the number of interference structures in the interior cavity are non-limiting. As illustrated in FIGS. 13-14, a single interference structure is positioned in the interior cavity. The interference structure is positioned adjacent to stop 725; however, this is not required. The shape of the interference structure is illustrated as a right angle triangle that slopes downwardly from stop 725 and terminates at a location that is spaced from bushing 714; however, it can be appreciated that the interference structure can terminate at bushing 724. The downward slope is illustrated as being a constant slope angle; however, this is not required. One or more portions of the outer surface of the interference structure and/or the outer surface of the compressible sleeve can include a coating or material that increases or reduces the friction between the interference structure and the outer surface of the compressible sleeve; however, this is not required.

As illustrated in FIG. 14, when the rod is moved toward the fully extended position and the rod causes the compressible sleeve to move off of interference structure 716 and the compressible sleeves moves away from the stop, the compressible sleeve reduces in compression and deformation due to the downward cross-sectional slope of the interference structure. As such, the amount of force needed to cause the rod to continue to move toward the fully extended position continues to decrease until the compressible sleeve moves off of the interference structure and/or is adjacent to bushing 714. When the compressible sleeve is not in contact with the interference structure, all or a portion of the outer surface of the compressible sleeve can be spaced from the inner surface of the interior cavity and thus not be in a compressed state, or the outer surface of the compressible sleeve can be in contact with the inner surface of the interior cavity, and thus be in a compressed state or be in a state just prior to the compression of the compressible sleeve; however, this is not required.

Referring now to FIG. 13, when the rod is moved toward the fully retracted position, the movement of the rod causes the compressible sleeve to move toward stop 725 and engage interference structure 716. As the compressible sleeve moves away from bushing 714 and engages the interference structure, the compressible sleeve is caused to deform and compress and exert a pressure on the rod and/or interference structure (as illustrated by the arrows), which pressure increases the frictional force between the compressible sleeve and the rod and/or inner surface of the interior cavity. The amount of force needed to cause the rod to continue to move toward the fully retracted position continues to increase until the compressible sleeve moves adjacent to stop 725. As such, the length and shape of the interference structure and the number of interference structures in combination with the size, shape, thickness and material of the compressible sleeve can be selected to create customized force profiles required to move the rod between the fully extended and fully retracted positions. The use or one or more mechanical springs and/or fluid in the interior cavity can also be used to customize the force profiles of the spring system.

While considerable emphasis has been placed herein on the structures and configurations of the preferred embodiments of the invention, it will be appreciated that other embodiments, as well as modifications of the embodiments disclosed herein, can be made without departing from the principles of the invention. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

What is claimed is:

1. A spring system that includes a compressible material used to affect the operation of the spring system between fully extended and fully retracted positions, said spring system comprising:
    a housing body having a front portion with a front end, a rear portion with a rear end, and an internal cavity;
    a rod that is at least partially positioned in said internal cavity and at least partially extending outwardly from said front end of said housing body, said rod movable between said fully extended and fully retracted positions, said rod having a front end and a back end;
    a first compressible sleeve formed of a compressible and/or deformable material configured to affect movement of said rod within said internal cavity when said first compressible sleeve is exposed to a compression force, said first compression sleeve configured to move relative to said rod along only a portion of a longitudinal length of said rod as said rod moves from said fully extended position to said fully retracted position and from said fully retracted position to said fully extended position such that said compressible sleeve moves to different positions along said longitudinal length of said rod;
    a first stop, said first stop a) connected to said rod and spaced from said front end and said back end of said rod, or b) fixed in position in said internal cavity of said housing body; said first compressible sleeve positioned between i) said first stop and said back end of said rod, or ii) said first stop and said front end of said housing; said first compressible sleeve having a width such that said first compressible sleeve does not simultaneously contact I) said first stop and said back end of said rod, or II) said first stop and said front end of said housing such that at least one end of said first compressible sleeve is caused to disengage from any structure in said housing body when said rod moves from said fully extended position to said fully retracted position and from said fully retracted position to said fully extended position; said first stop configured to limit movement of said first compressible sleeve as said rod moves between said fully extended and fully retracted positions, said first compression sleeve movably positioned on said rod so as to engage and to disengage from said first stop as said rod moves between said fully extended to said fully retracted position and said fully retracted position; and,
    a compression structure configured to cause said first compressible sleeve to compress and/or deform when said rod moves between said fully extended and fully retracted positions, said compression structure positioned on a portion of said rod, on an inner surface of said internal cavity, or combinations thereof.

2. The spring system as defined in claim 1, wherein said first compressible sleeve is at least partially positioned about said rod, said first compressible sleeve is caused to compress and/or deform when said rod moves between said fully extended and fully retracted positions when a) said first compressible sleeve moves along a longitudinal length of a portion of said rod that has a variable cross-sectional area, variable cross-sectional shape, or combinations thereof, b) said first compressible sleeve contacts a portion of said inner surface of said interior cavity that has a variable cross-sectional area, variable cross-sectional shape, or combinations thereof, or c) a and b.

3. The spring system as defined in claim 1, wherein said compression structure includes a portion of said rod that is positioned between said first stop and said back end of said rod and which compression structure has a variable cross-sectional area, a variable cross-sectional shape, or combinations thereof, said compression structure is configured to contact said first compressible sleeve when said rod moves between said fully extended and fully retracted positions.

4. The spring system as defined in claim 1, wherein said compression structure is positioned on a portion of said interior cavity and which compression structure has a variable cross-sectional area, a variable cross-sectional shape, or combinations thereof, said compression structure is configured to contact said first compressible sleeve when said rod moves between said fully extended and fully retracted positions.

5. The spring system as defined in claim 3, wherein said compression structure is positioned on a portion of said interior cavity and which compression structure has a variable cross-sectional area, a variable cross-sectional shape, or combinations thereof, said compression structure is configured to contact said first compressible sleeve when said rod moves between said fully extended and fully retracted positions.

6. The spring system as defined in claim 1, including a front bushing that is positioned at least partially in said internal cavity and located at said front portion of said housing body, said front bushing includes an opening to enable at least a portion of said rod to move through said opening as said rod moves between fully extended and fully retracted positions, said first compression sleeve configured to engage said first stop while being spaced from said front bushing, said first compression sleeve configured to engage said front bushing while being spaced from said first stop.

7. The spring system as defined in claim 4, including a front bushing that is positioned at least partially in said internal cavity and located at said front portion of said housing body, said front bushing includes an opening to enable at least a portion of said rod to move through said opening as said rod moves between fully extended and fully retracted positions, said first compression sleeve configured to engage said first stop while being spaced from said front bushing, said first compression sleeve configured to engage said front bushing while being spaced from said first stop.

8. The spring system as defined in claim 5, including a front bushing that is positioned at least partially in said internal cavity and located at said front portion of said housing body, said front bushing includes an opening to enable at least a portion of said rod to move through said opening as said rod moves between fully extended and fully retracted positions, said first compression sleeve configured to engage said first stop while being spaced from said front bushing, said first compression sleeve configured to engage said front bushing while being spaced from said first stop.

9. The spring system as defined in claim 1, including a mechanical spring positioned in said internal cavity of said housing, at least a portion of said mechanical spring positioned between a) said back end of said rod and said rear end of said housing body, or b) said front end of said housing body and said back end of said rod.

10. The spring system as defined in claim 2, including a mechanical spring positioned in said internal cavity of said housing, at least a portion of said mechanical spring positioned between a) said back end of said rod and said rear end of said housing body, or b) said front end of said housing body and said back end of said rod.

11. The spring system as defined in claim 3, including a mechanical spring positioned in said internal cavity of said housing, at least a portion of said mechanical spring positioned between a) said back end of said rod and said rear end of said housing body, or b) said front end of said housing body and said back end of said rod.

12. The spring system as defined in claim 4, including a mechanical spring positioned in said internal cavity of said housing, at least a portion of said mechanical spring positioned between a) said back end of said rod and said rear end of said housing body, or b) said front end of said housing body and said back end of said rod.

13. A method for affecting the compression of the spring system between fully extended and fully retracted positions, said method comprising the steps of:
   a. providing a spring system, said spring system comprising:
      a housing body having a front portion with a front end, a rear portion with a rear end, and an internal cavity;
      a rod that is at least partially positioned in said internal cavity and at least partially extending outwardly from said front end of said housing body, said rod movable between said fully extended and fully retracted positions, said rod having a front end and a back end;
      a first compressible sleeve formed of a compressible and/or deformable material configured to affect movement of said rod within said internal cavity when said first compressible sleeve is exposed to a compression force, said first compression sleeve configured to move relative to said rod along only a portion of a longitudinal length of said rod as said rod moves from said fully extended position to said fully retracted position and from said fully retracted position to said fully extended position such that said compressible sleeve moves to different positions along said longitudinal length of said rod;
      a first stop, said first stop a) connected to said rod and spaced from said front end and said back end of said rod, or b) fixed in position in said internal cavity of said housing body; said first compressible sleeve positioned between i) said first stop and said back end of said rod, or ii) said first stop and said front end of said housing; said first compressible sleeve having a width such that said first compressible sleeve does not simultaneously contact I) said first stop and said back end of said rod, or II) said first stop and said front end of said housing such that at least one end of said first compressible sleeve is caused to disengage from any structure in said housing body when said rod moves from said fully extended position to said fully retracted position and from said fully retracted position to said fully extended position; said first stop configured to limit movement of said first compressible sleeve as said rod moves between said fully extended and fully retracted positions, said first compression sleeve movably positioned on said rod so as to engage and to disengage from said first stop as said rod moves between said fully extended to said fully retracted position and said fully retracted position; and,
      a compression structure configured to cause said first compressible sleeve to compress and/or deform when said rod moves between said fully extended and fully retracted positions, said compression structure positioned on a portion of said rod, on an inner surface of said internal cavity, or combinations thereof; and,
   b. applying a force to an end of said rod to cause said rod to move between said fully extended and fully retracted positions, said movement of said rod causing said first compressible sleeve to compress and/or deform, said compression and/or deformation of said first compression sleeve causing increased friction between said first compression sleeve and a) said rod, b) said inner surface of said interior cavity, c) a structure in said interior cavity, or d) combinations thereof.

14. The method as defined in claim 13, wherein said first compressible sleeve is at least partially positioned about said rod, said first compressible sleeve is caused to compress and/or deform when said rod moves between said fully extended and fully retracted positions when a) said first compressible sleeve moves along a longitudinal length of a portion of said rod that has a variable cross-sectional area, variable cross-sectional shape, or combinations thereof, b) said first compressible sleeve contacts a portion of said inner surface of said interior cavity that has a variable cross-sectional area, variable cross-sectional shape, or combinations thereof, or c) a and b.

15. The method as defined in claim 13, wherein said compression structure includes a portion of said rod that is positioned between said first stop and said back end of said rod and which compression structure has a variable cross-sectional area, a variable cross-sectional shape, or combinations thereof, said compression structure is configured to contact said first compressible sleeve when said rod moves between said fully extended and fully retracted positions.

16. The method as defined in claim 13, wherein said compression structure is positioned on a portion of said interior cavity and which compression structure has a variable cross-sectional area, a variable cross-sectional shape, or combinations thereof, said compression structure is configured to contact said first compressible sleeve when said rod moves between said fully extended and fully retracted positions.

17. The method as defined in claim 15, wherein said compression structure is positioned on a portion of said interior cavity and which compression structure has a variable cross-sectional area, a variable cross-sectional shape, or combinations thereof, said compression structure is configured to contact said first compressible sleeve when said rod moves between said fully extended and fully retracted positions.

18. The method as defined in claim 13, including a front bushing that is positioned at least partially in said internal cavity and located at said front portion of said housing body, said front bushing includes an opening to enable at least a portion of said rod to move through said opening as said rod moves between fully extended and fully retracted positions, said first compression sleeve configured to engage said first stop while being spaced from said front bushing, said first compression sleeve configured to engage said front bushing while being spaced from said first stop.

19. The method as defined in claim 16, including a front bushing that is positioned at least partially in said internal cavity and located at said front portion of said housing body, said front bushing includes an opening to enable at least a portion of said rod to move through said opening as said rod moves between fully extended and fully retracted positions, said first compression sleeve configured to engage said first stop while being spaced from said front bushing, said first compression sleeve configured to engage said front bushing while being spaced from said first stop.

20. The method as defined in claim 17, including a front bushing that is positioned at least partially in said internal cavity and located at said front portion of said housing body, said front bushing includes an opening to enable at least a portion of said rod to move through said opening as said rod moves between fully extended and fully retracted positions, said first compression sleeve configured to engage said first stop while being spaced from said front bushing, said first compression sleeve configured to engage said front bushing while being spaced from said first stop.

21. The method as defined in claim 13, including a mechanical spring positioned in said internal cavity of said housing, at least a portion of said mechanical spring positioned between a) said back end of said rod and said rear end of said housing body, or b) said front end of said housing body and said back end of said rod.

22. The method as defined in claim 14, including a mechanical spring positioned in said internal cavity of said housing, at least a portion of said mechanical spring positioned between a) said back end of said rod and said rear end of said housing body, or b) said front end of said housing body and said back end of said rod.

23. The method as defined in claim 15, including a mechanical spring positioned in said internal cavity of said housing, at least a portion of said mechanical spring positioned between a) said back end of said rod and said rear end of said housing body, or b) said front end of said housing body and said back end of said rod.

24. The method as defined in claim 16, including a mechanical spring positioned in said internal cavity of said housing, at least a portion of said mechanical spring positioned between a) said back end of said rod and said rear end of said housing body, or b) said front end of said housing body and said back end of said rod.

* * * * *